United States Patent [19]

Inada

[11] Patent Number: 5,717,448
[45] Date of Patent: Feb. 10, 1998

[54] INK JET PRINTING APPARATUS AND INK JET PRINTING METHOD

[75] Inventor: Genji Inada, Yokohama, Japan

[73] Assignee: Canon Kabushiki Kaisha, Tokyo, Japan

[21] Appl. No.: 783,794

[22] Filed: Jan. 15, 1997

Related U.S. Application Data

[63] Continuation of Ser. No. 282,327, Jul. 29, 1994, abandoned.

[30] Foreign Application Priority Data

| Jul. 30, 1993 | [JP] | Japan | 5-190069 |
| Aug. 27, 1993 | [JP] | Japan | 5-212544 |
| Nov. 11, 1993 | [JP] | Japan | 5-282802 |

[51] Int. Cl.$^6$ .................... B41J 2/21; B41J 29/38
[52] U.S. Cl. .................... 347/43; 347/14
[58] Field of Search .................... 347/43, 40, 14, 347/9, 12

[56] References Cited

U.S. PATENT DOCUMENTS

| 4,178,597 | 12/1979 | Isayama et al. |
| 4,503,444 | 3/1985 | Tacklind . |
| 4,595,948 | 6/1986 | Itoh et al. . |
| 4,855,752 | 8/1989 | Bergstedt . |
| 5,111,302 | 5/1992 | Chan et al. ............ 347/15 |
| 5,124,722 | 6/1992 | Moriyama et al. ........ 347/9 |

FOREIGN PATENT DOCUMENTS

| 0390473 | 10/1990 | European Pat. Off. . |
| 57-160654 | 10/1982 | Japan . |
| 59-207265 | 11/1984 | Japan . |
| 61-290060 | 12/1986 | Japan . |
| 63-053052 | 3/1988 | Japan . |
| 1114447 | 5/1989 | Japan .................... 347/43 |

Primary Examiner—Benjamin R. Fuller
Assistant Examiner—Thinh Nguyen
Attorney, Agent, or Firm—Fitzpatrick, Cella, Harper & Scinto

[57] ABSTRACT

In the case that a size of each liquid droplet is enlarged to such an extent that liquid droplets each having a different color come in contact with each other on a printing medium before completion of penetration into the printing medium, e.g., when the number of liquid droplets nb required for forming a black pixel and the number of liquid droplets ny required for forming a yellow pixel are "7", a maximum number of liquid droplets capable of overlapping each other at a substantially same location is limitatively determined to assume a value smaller than the numeral "7", which that is a normally employed maximum numeral with respect to at least one ink color, e.g., yellow, whereby an image can be obtained without any deterioration of quality while preventing a malfunction of color-staining from arising along the boundary between adjacent ranges each having an ink color.

21 Claims, 34 Drawing Sheets ny = 1          nb = 1 ny = 2          nb = 2 ny = 3          nb = 3 ny = 4          nb = 4 ny = 4          nb = 5 ny = 4          nb = 6

LARGEST DOT   ny = 4        nb = 7

FIG. 2A n=1
PRIOR ART
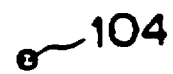
FIG. 2B n=2
PRIOR ART
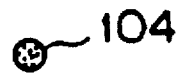
FIG. 2C n=3
PRIOR ART
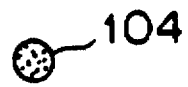
FIG. 2D n=4
PRIOR ART
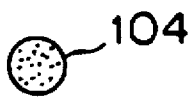
FIG. 2E n=5
PRIOR ART
FIG. 2F n=6
PRIOR ART
LARGEST DOT n=7
FIG. 2G
PRIOR ART
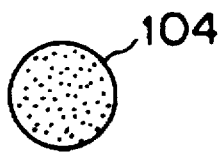

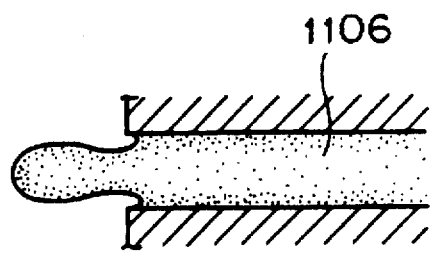
FIG. 5A(1)
PRIOR ART
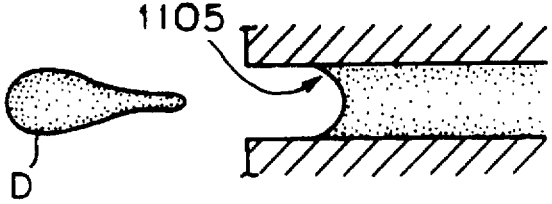
FIG. 5A(2)
PRIOR ART
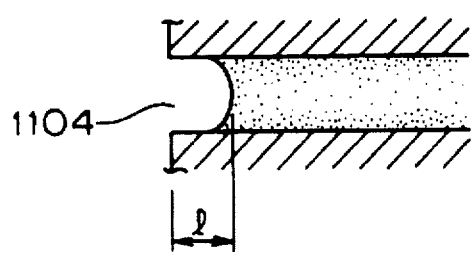
FIG. 5A(3)
PRIOR ART
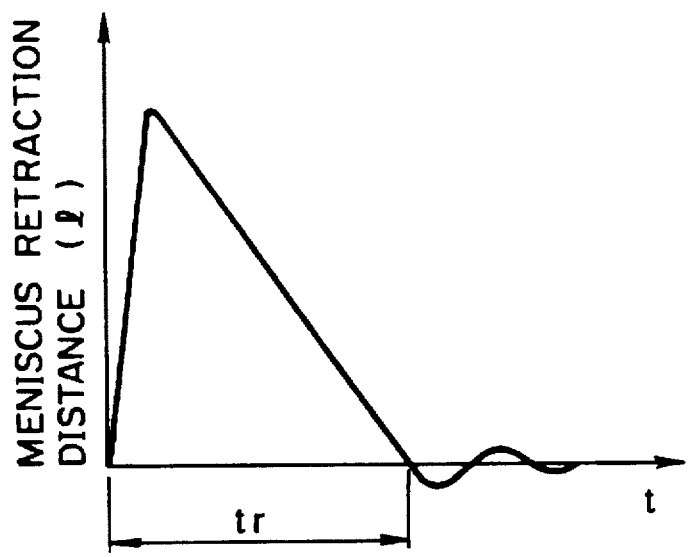
FIG. 5B
PRIOR ART FIG. 8A $(n_1, n_2) = (1, 0)$  —P1
FIG. 8B $(0, 1)$  —P2
FIG. 8C $(1, 1)$  —P3
FIG. 8D $(2, 1)$ 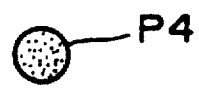 —P4
FIG. 8E $(1, 2)$  —P5
FIG. 8F $(2, 2)$  —P6
FIG. 8G $(3, 2)$  —P7

FIG. 9B  ny=1   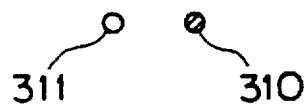   nb=1
FIG. 9C  ny=7   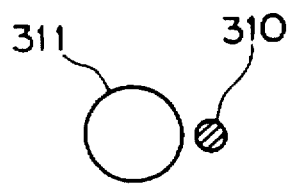   nb=3
FIG. 9D  ny=7   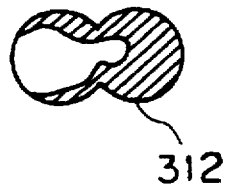   nb=7

FIG. 11A ny=1  nb=1
FIG. 11B ny=2  nb=2
FIG. 11C ny=3  nb=3
FIG. 11D ny=4  nb=4
FIG. 11E ny=4  nb=5
FIG. 11F ny=4  nb=6
LARGEST DOT ny=4 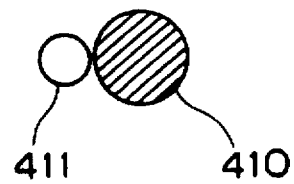 nb=7
FIG. 11G

FIG. 12A ny=1  nb=1
FIG. 12B ny=2  nb=2
FIG. 12C ny=3  nb=3
FIG. 12D ny=4  nb=4
FIG. 12E ny=5  nb=5
FIG. 12F ny=6  nb=6
LARGEST DOT  ny=6
  nb=6

LARGEST DOT  ny=7
     nb=4

FIG. 20A $(ny_1, ny_2)$ (1,0)   ∘ •   $(nb_1, nb_2)$ (1,0)
FIG. 20B (0,1)      (0,1)
FIG. 20C (1,1)      (1,1)
FIG. 20D (2,1)      (2,1)
FIG. 20E (1,2)      (1,2)
FIG. 20F (3,1)   (2,2)
FIG. 20G (5,0)   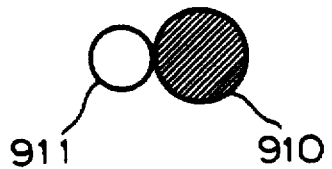   (3,2)
911     910

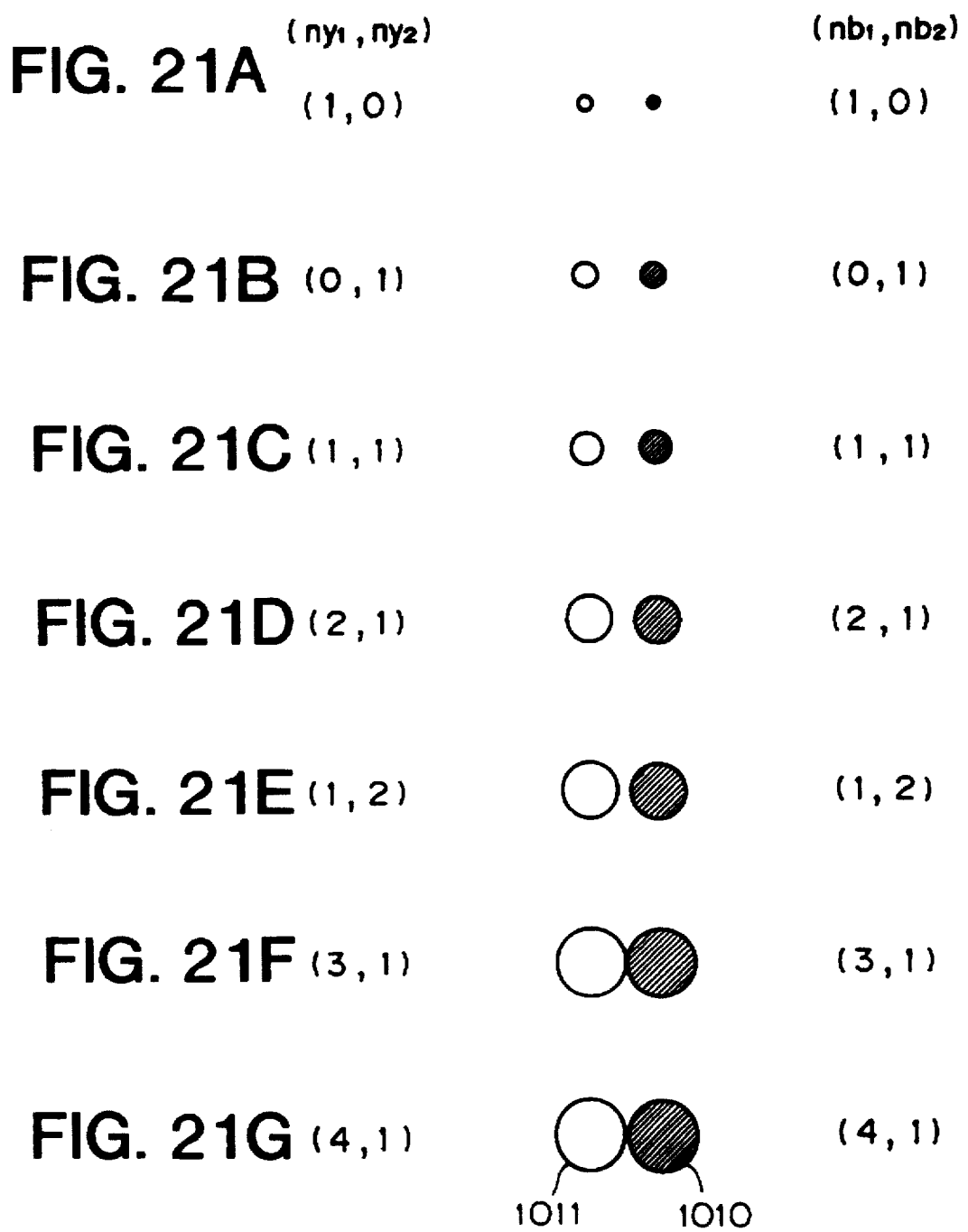

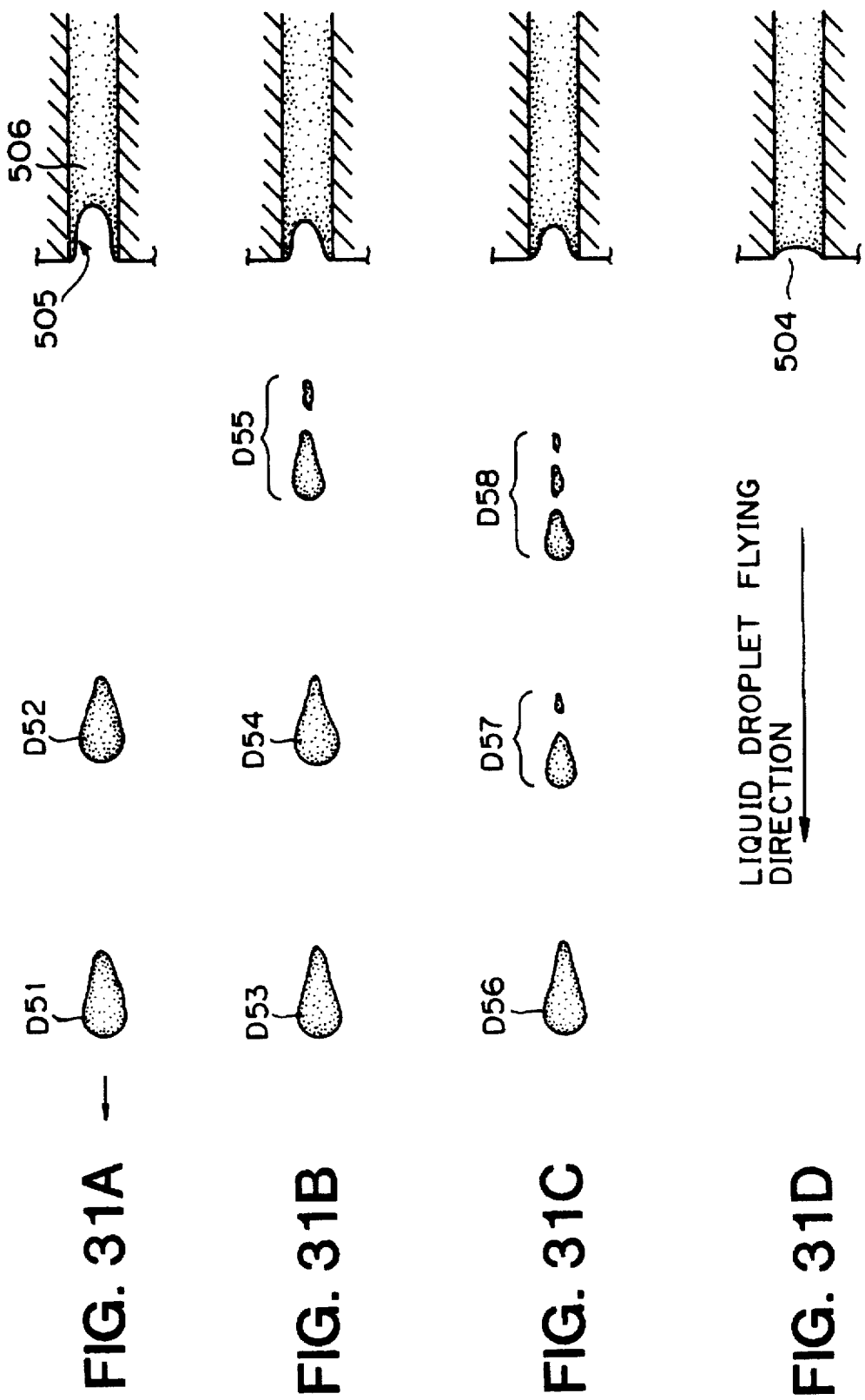

n=1 n=2 n=3 n=4 n=5 n=6 n=7 n=1 n=2 n=3 n=4 n=5 n=6 n=7 n=8 n = 1 n = 2 n = 3 n = 4 n = 5 n = 6 n = 7

INK JET PRINTING APPARATUS AND INK JET PRINTING METHOD

This application is a continuation application of application Ser. No. 08/282,327, filed Jul. 29, 1994, now abandoned.

BACKGROUND OF THE INVENTION

1. Field of the Invention

The present invention relates generally to an ink jet printing apparatus and an ink jet printing method. More particularly, the present invention relates to an ink jet printing apparatus and an ink jet printing method both of which assure that one dot is formed by shooting a plurality of liquid droplets onto a printing medium at a substantially same location thereof.

2. Description of the Related Art

An ink jet printing apparatus is used for ejecting ink from ejection outlets of an ink jet printing head to a printing medium in the form of very small liquid droplets so that an image such as a character, a figure, a picture or the like is printed on the printing medium. Among various kinds of ink jet printing apparatuses, an ink jet color printing apparatus is used to form a pixel with a plurality of colored inks typically composed of a black-colored ink, a cyan colored ink, a magenta-colored ink and a yellow-colored ink by making a combination among these colored inks in accordance with a desired color to dispose respectively on the printing medium or to overlap each other on the printing medium. It has been hitherto known that the ink jet ink printing apparatus exhibits highly acceptable advantages not only as high resolution color image outputting means but also as high speed printing means.

It should be noted that a printing medium to be used in the ink jet printing apparatus should not be limited only to a sheet of recording paper, a sheet of paper for OHP or the like each of which has been widely known, but various kinds of media capable of allowing ink to be affixed thereto, e.g., a printing/dyeing cloth is also employable as a printing medium. Accordingly, it should be construed that not only a sheet of recording paper but also various kinds of printing media capable of allowing ink to be printed thereon are employable for an ink jet printing apparatus and an ink jet printing method as will be described later.

A method of representing a gradation in an image printed by an ink jet printing apparatus of the foregoing type is exemplified by a method of representing a gradation by binarizing an image signal based on a predetermined threshold value while a single pixel is formed in response to that image signal, (hereinafter referred to as a Dither method) and a method of representing a gradation in an image depending on the number of liquid droplets forming a single dot which is formed by shooting a plurality of liquid droplets onto a printing medium at a substantially same location as disclosed in Japanese Patent Application Laying-Open No. 63-53052 (hereinafter referred to as a multi-droplet system). Among conventional methods each employable for representing a gradation in an image, especially, the multi-droplet system is advantageously acceptable because it is found that each printing operation can be achieved in a high gradation mode with the aid of an ink jet recording head adapted to eject very small liquid droplets therefrom while maintaining a high resolution.

To facilitate understanding of the present invention, the multi-droplet system will be described below with reference to FIG. 1 to FIG. 8.

FIGS. 1A–1E comprise an explanatory view which illustratively shows by way of example the conventional multi-droplet system.

When a first liquid droplet D1 is ejected from an ink jet head (not shown) and shot onto a printing medium 105, a semispherical liquid droplet 101 is formed on the printing medium 105 by the function of a surface tension. While at this time, a second liquid droplet D2 is ejected from the ink jet head subsequent to the previously ejected liquid droplet D1. Since a time that elapses until the shot liquid droplet 101 penetrates into the printing medium 105 is estimated to be several hundreds milliseconds or more but an ejection frequency of each liquid droplet Dn, which is set between 0.1–20 KHz in a practical ink jet printing apparatus, is shorter than the foregoing penetration time, the liquid droplet D1 and the liquid droplet D2 are united with each other before penetration of the shot liquid droplet 101 into the printing medium 105, causing a larger liquid droplet 103 to be formed on the printing medium 105. In such manner, liquid droplets Dn are successively ejected from the ink jet head and shot onto the printing medium 105 to form a shot liquid droplet having a larger size. In the meantime, since liquid penetration proceeds, a dot 104 is formed on the printing medium 105.

FIGS. 2A–2G comprise an explanatory view which illustratively shows the relationship between the number of ejected liquid droplets n and a size of the dot 104 formed in the above-described manner. Specifically, FIG. 2 shows the case that the maximum number of liquid droplets forming a dot is seven.

As is apparent from the drawing, a size of the dot 104 can be changed as the number of ejected liquid droplets n is changed. In practice, the size of the dot 104 serves as a significant factor for determining the optical density of an image to be printed. Thus, when the multi-drop system is employed as an ink jet printing method, it is possible to determine the optical density of a finally printed image by adequately controlling the number of ejected liquid droplets n at the time of formation of each dot constituting a certain image.

FIG. 3 is a graph which schematically shows the relationship between the number of ejected liquid droplets n and the optical density. Specifically, FIG. 3 shows the case that the number of ejected liquid droplet n lies within the range of 1 to 5.

The relationship shown in the drawing represents the case that a printing medium lined with an ink absorbing layer over the surface thereof is printed with a black-colored ink having the following composition under conditions that a quantity of one liquid droplet is set to 10 pl and a pixel density is set to 400 dpi.

| (ink) | diethylene glycol | 30.0% by weight |
|---|---|---|
| | water | 67.0% by weight |
| | pigment (CI. FB2) | 3.0% by weight |
| (printing medium) | U mat coat C paper manufactured by Mitsubishi paper Co., Ltd. | |

As is apparent from FIG. 3, the optical density assumes a value of about 0.4 when the number of ejected liquid droplet n is one and it assumes a value of about 1.4 when n is five. Thus, a comparatively large difference in optical density can be obtained by changing the number of ejected liquid droplets n in that way.

FIG. 4 is a diagram which shows a series of head driving pulses to be sequentially applied to the ink jet head when the conventional multi-drop system is employed as an ink jet recording method. The ink jet head forms gas bubbles in ink by utilizing the thermal energy generated as a series of voltage pulses are applied to the ink jet head as shown in the drawing, whereby liquid droplets are ejected from the ink jet head by the pressure induced as the gas bubbles grow in the ink. A plurality of pulses P21 to P25 shown in FIG. 4 correspond to the respective ejected liquid droplets. Therefore, FIG. 4 shows the case that an image is printed on the printing medium by forming a dot with a maximum number of five liquid droplets represented by n=5.

As shown in FIG. 4, voltage pulses P21 to P25 are successively applied to the ink jet head at a constant ejection frequency f within the period of time defined by a dot formation frequency of fo, i.e., a dot forming period of 1/fo. It of course is obvious that in the case that the number of liquid droplets required for forming a dot is a numeral other than five, a plurality of voltage pulses corresponding to the number of liquid droplets are likewise applied to the ink jet head within the period of time defined by the dot forming period of 1/fo.

When it is intended from the viewpoint of a printing speed that a value representing the ejection frequency f is increased, the ejection frequency f is largely restricted by the refill properties determined by the ink jet head and an ink supplying system associated with the ink jet head. As shown in FIGS. 5A(1)–5A(3) and FIG. 5B, a refill frequency representing the refill properties can be defined as a reciprocal number of the shortest time tr that elapses until an ink meniscus 1105 retracted in the rearward direction by ejection of one liquid droplet returns near to an ejection outlet 1104. Since the liquid droplet ejecting state can be stabilized by reducing the ejection frequency f to assume a value smaller than the refill frequency, the ejection frequency f can be set to be equal to or smaller than the refill frequency when the conventional multi-drop system is employed as an ink jet printing method.

A characterizing feature of the conventional multi-drop system as described above with reference to FIG. 1 to FIG. 5 consists in that a plurality of liquid droplets continuously ejected from a same ejection outlet of the ink jet head are successively shot on the printing medium at the substantially same location. In addition, there is also known a multi-drop system which is practiced such that a plurality of liquid droplets are ejected from different ejection outlets. One pattern of ejecting a plurality of liquid droplets from different ejection outlets is such that they are ejected from different ejection outlets among a row of ejection outlets, while the other pattern of the same is such that they are ejected from respective ejection outlets among different rows of ejection outlets.

FIG. 6 is a perspective view which explains a multi-drop system of the type wherein liquid droplets are ejected from respective ejection outlets among different rows of ejection outlets on a printing head 801 mounted on a carriage 803.

The printing head 802 includes an outlets arrangement surface 802 on which two rows of ejection outlets R1 and R2 are arranged with a gap of 0.635 µm kept therebetween. With respect to each of the rows of ejection outlets R1 and R2, a plurality of ejection outlets are arranged with a pitch of 0.0635 µm to define a set of ejection outlets while maintaining a predetermined relationship between two rows of ejection outlets R1 and R2. Specifically, as shown in FIG. 6, an ejection outlet Mi in the row of ejection outlets R1 and an ejection outlet Ni in the row of ejection outlets R2 are located such that liquid droplets can be ejected to a same location on the printing medium during scanning of the carriage 803. Same or similar relationship is established with respect to other set of ejection outlets. Here, each ejection outlet on the row of ejection outlets R1 is designed to eject a liquid droplet (D1) having a volume of about 5 pl and each ejection outlet on the row of ejection outlets R2 is likewise designed to eject a liquid droplet (D2) having a volume of about 10 pl.

With this construction, the size of a dot can adequately be controlled by shooting a predetermined number of liquid droplets D1 and a predetermined number of liquid droplets D2 to a substantially same location on the printing medium in the overlapped state. For example, it is assumed that a shortest ejection time interval of each liquid droplet is set to 2.5 msec and a moving speed of the carriage 803 is set to 63.5 mm/sec. In the case that a pixel is formed by shooting liquid droplets having a total quantity of ink of 25 pl from the ejection outlets Mi and Ni to the substantially same location on the printing medium in the overlapped state, it is sufficient that voltage pulses as shown in FIG. 7 are applied to a heater so that one liquid droplet D1 is ejected from the ejection outlet Mi and two liquid droplets D2 are ejected from the ejection outlet Ni.

FIGS. 8A–8G illustratively show by way of example the state that a dot is formed in accordance with the multi-droplet system for an ink jet printing apparatus.

As shown in FIGS. 8–8G, a dot having seven kinds of sizes as represented by P1 to P7 can be obtained by shooting a total number of five liquid droplets D1 and D2 to the printing medium in the overlapped state. In FIGS. 8A–8G reference characters n1 add n2 designate the number of liquid droplets D1 and D2 to be shot onto the printing medium at the substantially same location with the overlapped state.

It has been known that the conventional multi-droplet system as described above with reference to FIG. 1 to FIG. 8 has two problems to be solved.

A first problem is concerned with a malfunction of color-mixing which arises when a color printing operation is performed in accordance with the multi-drop system.

Specifically, in the case that a colored image is printed on a printing medium by operating the ink jet printing apparatus, a malfunction of color-staining arises along the boundary between adjacent ranges each having a different color or between two dots each having a different color, i.e., two small range units. In detail, liquid droplets each having a different color such as liquid droplets 101 and 103 shown in FIG. 1 are mixed with each other, resulting in the contour of an image failing to be clearly visually recognized. This leads to the problem that a quality of printed image is degraded.

With respect to the multi-droplet system, in the case that one dot is formed with many liquid droplets, i.e., liquid droplets each having an enlarged size and a different color come in contact with each other on the printing medium, the aforementioned malfunction of color-mixing occurs with the dot formed on the printing medium. When colored-droplets located adjacent to each other exhibit a large difference in brightness, e.g., in the case that a yellow-colored ink droplet and a black-colored ink droplet are located adjacent to each other, a quality of printed image is remarkably degraded.

FIG. 9A to FIG. 9D are illustrative views which concretely explain the problem of color-mixing as mentioned above, respectively.

Referring to FIG. 9A, a set of dots 311 and 310 located within the range defined by a dotted line extending between a yellow-colored monochromatic range 307 and a black-colored monochromatic range 306 has a high possibility that a malfunction of color-mixing arises due to contact of these dots with each other.

In this case, when the number of each of liquid droplets nb and ny required for forming dots is reduced to such an extent that liquid droplets located adjacent to each other do not come in contact with each other on the printing medium, e.g., when the number of each of liquid droplets nb and ny is just one as shown in FIG. 9B or when both the liquid droplets do not come in contact with each other due to a large difference in the number of liquid droplets n as shown in FIG. 9C, monochromatic dots 311 and 310 are formed on the printing medium. However, when the number of each of liquid droplets nb and ny is increased to such an extent that liquid droplets located adjacent to each other come in contact with each other, e.g., in the case as shown in FIG. 9D, both the liquid droplets come in contact with each other before completion of their penetration into the printing medium or in the course of their penetration, resulting in a malfunction of color-mixing arising with the liquid droplets. In general, penetration of ink into the printing medium starts when a time of several hundred milliseconds elapses after an ink droplet is shot onto the printing medium. However, since a malfunction of color-mixing arises faster than the completion of penetration of the liquid droplets by the function of surface tension of each ink, a black-colored ink and a yellow-colored ink are already mixed with each other on completion of the penetration, resulting in a color-mixed dot 312 being formed on the printing medium. In the case that a malfunction of color-mixing arises along the boundary between a black-colored monochromatic range and a yellow-colored monochromatic range with a width corresponding to a plurality of dots in each of which the malfunction of color-mixing arises, the contour of an image can not clearly visually recognized, resulting in a quality of image being degraded. Such degrading the quality of image arises not only in the boundary between the black-colored monochromatic range and the yellow-colored monochromatic range but also in the boundaries between other set of two colored monochromatic ranges.

It should be noted that the problem of color-mixing as mentioned above does not arise merely attributable to the fact that dots each having a different color are located adjacent to each other but in the case that a large quantity of ink is required for forming dots each having a same color, there arises an occasion that a quantity of ink required for forming all the dots is increased, causing the foregoing ink to be mixed with another kind of ink having a different color.

A second problem of the conventional multi-droplet system is concerned with the optical density of an image printed in accordance with the multi-droplet system.

Specifically, in the case that an image having a higher gradation is printed on the printing medium in accordance with the multi-droplet system while maintaining a predetermined resolution, it is preferable that an optical density is increased by a small quantity every time one liquid droplet is shot onto the printing medium to form one dot. In addition, it is preferable from the viewpoint of controlling properties of an image as well as a gradation of the latter that a quantity of variation of an optical density caused as the number of liquid droplets required for forming one dot varies is kept substantially constant regardless of the number of liquid droplets. In general, however, as the number of liquid droplets n required for forming one dot increases, a rate of increasing of the optical density of each image gradually varies.

The characteristic curve described above with reference to FIG. 3 is upward convexly bent, and this makes it clear that as the number of liquid droplets n increases, the rate of increasing the optical density of each image is reduced. Especially, in the case that the number of liquid droplets n is small, the optical density of each image more largely varies but such properties of the image as mentioned above are not preferable for expressing the gradation of a highlight image.

As a method for preventing different colored inks from mixing in the boundary, a proposal has been generally known with respect to a method of canceling a part of dots along the boundary between adjacent ranges each having a different color on a printed image. When this proposed method is employed, a probability of bringing two ranges each having a different color in contact with each other along the whole boundary therebetween can be reduced, and moreover, a total quantity of liquid droplets shot onto the printing medium can be reduced, whereby an occurrence of color-mixing along the whole boundary can be suppressed.

However, when this proposed method is practically employed, there arises an occasion that the resolution of a printed image is degraded along the boundary, and moreover, there is a possibility that a malfunction of white-colored stripe arises due to reduction of the optical density along the whole boundary with a part of dots removed therefrom. In addition, the proposed method has a more fundamental problem that this method is intended to eliminate the problem of color-mixing along the whole boundary to some extent but the foregoing proposal does not provide a method of solving the problem of color-mixing on the basis of a dot unit or on the basis of a pixel unit.

In addition, as another method for preventing different colored inks from mixing, another proposal has been generally known with respect to a method of ejecting a plurality of liquid droplets required for forming dots from a plurality of different ejection outlets while executing different scannings, and moreover, promoting penetration of liquid droplets into a printing medium at a time interval corresponding to each scanning without any formation of a large liquid droplet like the liquid droplet 103 shown in FIG. 1 as disclosed in U.S. Pat. No. 4,855,752.

It is certain that this proposed method has an advantage that fluctuation of ejection properties of an ink jet among a plurality of ejection outlets can be attenuated, but there arises an occasion that a printing speed of the ink jet head is reduced.

To practice a method of solving the second problem, i.e., a method of increasing the number of gray levels while maintaining the linearity of gradation variation especially for a highlight image, it is thinkable that liquid droplets each having a smaller volume are successively shot onto a printing medium in the overlapped state to form a dot therewith.

FIG. 10 is a graph which illustratively explains variation of the optical density of an image when an image pattern similar to that shown in FIG. 3 is printed on a printing medium with liquid droplets each having a volume equal to about a half of each liquid droplet used for the case exemplified in FIG. 3.

As shown in FIG. 10, while the number of liquid droplets n is set to a small numeral, it can be considered that a rate of variation of the gradation is kept substantially constant. In addition, when the number of liquid droplets n is set to one of 2, 3, 5, 6 and 8 to form a dot therewith, almost same variation steps can be obtained within the range defined by the substantially same optical density as that in the case shown in FIG. 3.

The method or structure of preparing liquid droplets each having a small volume is exemplified by a structure of designing liquid paths and ejection outlets in an ink jet head with smaller dimensions and a method of controlling the position of a meniscus in each liquid path in such a manner as to retract the meniscus in the rearward direction in the predetermined timing. Properties of each image shown in FIG. 10 are obtained by forming liquid droplets each having a volume of about 5 pl by employing a method of controlling a meniscus in an ink jet head exhibiting properties shown in FIG. 3.

However, one of the exemplified methods, i.e., the first-mentioned method is restrictively applicable because a method of producing liquid paths in an ink jet head has problems, while the last-mentioned method is likewise restrictively applicable because a special mechanism is required for constructing the ink jet head. In the case of the first-mentioned method, when it is intended that liquid droplets each having a small volume are ejected from the ink jet head for a long time, there arises an occasion that gas bubbles are accumulatively received in each liquid path or each ejection outlet is undesirably clogged with foreign materials.

SUMMARY OF THE INVENTION

The present invention has been made in consideration of the aforementioned background.

An object of the present invention is to provide an ink jet printing apparatus and an ink jet printing method both of which assure that the first problem and the second problem as mentioned above can satisfactorily be eliminated.

Another object of the present invention is to provide an ink jet printing apparatus and an ink jet printing method for both of which a multi-droplet system of forming one dot with a plurality of monochromatic liquid droplets is employed and both of which assure that plural kinds of inks each having a different color tone are not mixed with each other while preventing a quality of image from being degraded due to the vague contour of an image pattern without any necessity for substantially changing the color tone of an image or particularly changing or limiting the pattern of arrangement of dots on a printing medium.

A further object of the present invention is to provide an ink jet printing apparatus and an ink jet printing method for both of which a multi-droplet system of forming one dot with a plurality of monochromatic liquid droplets by shooting a plurality of liquid droplets onto a printing medium at a substantially same location or at neighborhood of the same location is employed and both of which assure that a high quality of image can be obtained by selectively using an ejection frequency for each of ejection outlets.

According to a first aspect of the present invention, there is provided an ink jet printing apparatus for performing printing with the aid of an ink jet head adapted to eject liquid droplets therefrom by ejecting a plurality of liquid droplets from the ink jet head to a substantially same location on a printing medium to form a dot which constructs the printing, comprising:

judging means for judging whether or not the number of liquid droplets for forming two dots located adjacent to each other on the printing medium is equal to or more than the predetermined numeral preliminarily determined corresponding to a combination made among numbers of liquid droplets required for forming each dot; and suppressing means for suppressing a quantity of liquid droplets for forming at least one of the two dots located adjacent to each other when the determining means determines that the number of liquid droplets required for forming the two dots located adjacent to each other is equal to or more than the predetermined numeral.

According to a second aspect of the present invention, there is provided an ink jet printing method of performing printing by ejecting a plurality of liquid droplets to a substantially same location on a printing medium to form a dot which constructs the printing, the method comprising the step of:

providing an ink jet head for ejecting the liquid droplets therefrom, detecting the number of liquid-droplets forming each dot, judging based on the result of the detecting, the number of liquid droplets forming two dots located adjacent to each other is equal to or more than the predetermined numeral preliminarily determined corresponding to a combination among numbers of liquid droplets required for forming each dot, and suppressing a quantity of liquid droplets for forming at least one of the two dots located adjacent to each other when the number of liquid droplets required for forming the two dots located adjacent to each other is equal to or more than the predetermined numeral.

According to a third aspect of the present invention, there is provided an ink jet printing method of performing printing by ejecting a plurality of liquid droplets to a substantially same location on a printing medium to form a dot which constructs the printing, comprising the step of;

suppressing a quantity of liquid droplets required for forming dots along the boundary between adjacent ranges each having a different color tone while the dot constructs the printing.

According to a fourth aspect of the present invention, there is provided an ink jet printing method of performing printing by ejecting a plurality of liquid droplets to a printing medium to form a dot which constructs the printing, comprising the steps of:

providing an ink jet head for ejecting the liquid droplets therefrom, and controlling liquid ejection in such a manner as to allow a frequency of ejecting the liquid droplets to include an ejection frequency larger than a refill frequency of the ink jet head when the dot is formed with a plurality of ink droplets.

Other objects, features and advantages of the present invention will become apparent from reading of the following description which has been made in conjunction with the accompanying drawings.

BRIEF DESCRIPTION OF THE DRAWINGS

FIGS. 2A–2G comprise an explanatory view which illustratively explains how the size of a dot varies when the multi-droplet system is employed;

FIGS. 5A(1)–5A(3) and FIG. 5B are illustrative views which illustratively explain how a meniscus in an ejection outlet is displaced, respectively;

FIGS. 8A–8G comprise an explanatory view which illustratively explains the state that a dot is formed by using a multi-droplet system;

FIG. 9A to FIG. 9D are schematic views which illustratively explain a problem of color-mixing inherent to a multi-drop system, respectively;

FIGS. 11A–11B comprise an explanatory view which illustratively explains a dot forming method to be practiced in accordance with a first embodiment of the present invention;

FIGS. 12A–12G comprise an explanatory view which illustratively explains an embodiment modified from the first embodiment of the present invention shown in FIG. 11;

FIGS. 13A–13G comprise an explanatory view which illustratively explains another modified embodiment modified from the first embodiment of the present invention shown in FIG. 11;

FIGS. 20A–20G comprise an explanatory view which illustratively explains dots to be formed by employing a colored ink jet printing method to be practiced in accordance with a second embodiment of the present invention;

FIGS. 21A–21G comprise an explanatory view which illustratively explains dots to be formed by employing an ink color jet printing method to be practiced in accordance with a modified embodiment modified from the second embodiment of the present invention;

FIGS. 22A–22G comprise an explanatory view which illustratively explains dots to be formed by employing an ink jet color printing method to be practiced in accordance with another modified embodiment modified from the second embodiment of the present invention;

FIG. 31A to FIG. 31D are explanatory views which explain the state that a liquid droplet is ejected from an ejection outlet, respectively;

DESCRIPTION OF THE PREFERRED EMBODIMENTS

The present invention will now be described in detail hereinafter with reference to the accompanying drawings which illustrate preferred embodiments thereof.

It should be noted that there is an occasion that in response to one ejection signal applied to a printing head, a plurality of secondary liquid droplets (satellite liquid droplets) are ejected from the printing head together with a main liquid droplet. Since these liquid droplets are shot onto a printing medium at a substantially same location thereof, there does not arise any particular problem even when both the main liquid droplet and the satellite liquid droplets are united with each other so as to allow them to be expressed as a single liquid droplet. In view of this fact, it is assumed that in response to one ejection signal, one liquid droplet is ejected from the printing head for the purpose of simplifying description of the present invention. In addition, it should be noted that in a description of the present invention, a term "printing (print)" or "recording (record)" means not only printing characters but printing images which includes an image expressing no meaning, and further, "ink" or "liquid" in the description or the present invention is restricted to one having a dye and a solvent, and the "ink" includes many kinds of liquid.

(A first embodiment)

FIGS. 11A–11G show shows by way of illustrative views an ink jet color printing method to be practiced in accordance with an embodiment of the present invention. Specifically, this embodiment is concerned with a method of restricting a maximum number of ink droplets to be shot on a substantially same location of a printing medium. Specifically, in an ink jet color printing method of this embodiment, two kinds of numerals 4 and 2 are preliminarily determined as a largest number of liquid droplets (a limitative number of liquid droplets) acceptable for allowing the liquid droplets to be shot onto the printing medium at a substantially same location, a maximum number of liquid droplets is selectively determined for each of inks, and a largest number of liquid droplets to overlap each other at the substantially same location is limitatively determined with respect to at least one of ink colors to assume a numeral of four smaller than a numeral of seven representing a normally usable largest number of liquid droplets, whereby there does not arise a malfunction of color-staining due to mixing of colors.

Figure 9A:
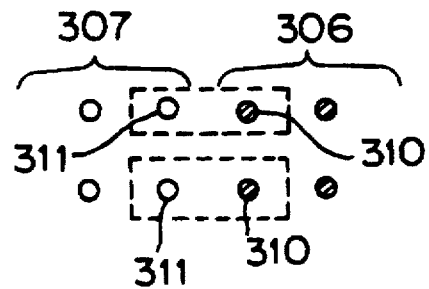

For example, in the case that one pixel is formed with a maximum number of seven black-colored liquid droplets and seven yellow-colored liquid droplets on an image, when an image range having a highest ink color density is required by bringing the black-colored range in contact with the yellow-colored range as shown in FIG. 9D, a largest dot 410 is formed on the printing medium on the assumption that the number nb of black-colored liquid droplets is set to be equal to seven in the black-colored range as shown in FIG. 11. On the contrary, with respect to a yellow-colored ink, a largest pixel can be formed on the printing medium on the assumption that the number ny of yellow-colored liquid droplets is set to be equal to seven in other range. In practice, however, a dot 411 is formed in the foregoing range by setting the number ny of yellow-colored liquid droplets not to assume a numeral of seven but to assume a numeral of four. At this time, dots can be formed in the proximity of the boundary between two monochromatic ranges without any occurrence of color-mixing after completion of penetration of the liquid droplets into the recording medium.

In the case that a size of each liquid droplet is enlarged to such an extent that liquid droplets come in contact with each other before inks each having a different color are penetrated into the printing medium, i.e., in the case that the number nb of black-colored ink droplets and the number ny of yellow-colored ink droplets are set to assume a numeral 7, respectively, an image can be obtained not only without any occurrence of color-staining along the boundary between two monochromatic ranges each having a different ink color but also without any deterioration of a quantity of image, by limitatively determining a maximum number of liquid droplets to overlap each other at a substantially same location smaller than a value representing a normally usable maximum number of liquid droplets with respect to at least one of ink colors.

In the case as shown in FIG. 11, only the number ny of yellow-colored liquid droplets is limitatively determined. Alternatively, as shown in FIGS. 12A–12G, it is acceptable that the number of black-colored liquid droplets and the number of yellow-colored liquid droplets are limitatively determined to assume a value smaller than seven, respectively. On the contrary to the method shown in FIG. 11, as shown in FIGS. 13A–13G, it is also acceptable that the number ny of yellow-colored liquid droplets is determined to assume a value of seven without limitative determination and the number n of black-colored liquid droplets is limitatively determined to assume a value of four. Taking a visual printed image into consideration, it is preferable that the number of liquid droplets which color has higher brightness is limitatively determined to a reduced number. The brightness in the above description is measured under the condition that a same pattern is printed on a same printing sheet by using same quantity of ink.

In addition, this embodiment is concerned with a printing method of temporarily changing a maximum number of liquid droplets to be shot onto a printing medium at a substantially same location from a value of n1 to another value of n2 smaller than the foregoing value of n1, e.g., in the case that a malfunction of color-mixing arising with inks each having a different color along the boundary between two monochromatic ranges is readily recognized. However, it is acceptable that the preliminarily determined maximum number n2 of liquid droplets is individually determined for each of ink colors. In addition, it is also acceptable that a plurality of maximum number n2, n3 and others of liquid droplets are determined with respect to one ink color in addition to the normally usable maximum number n1 of liquid droplets so that the maximum numbers n2, n3 and others are selectively used corresponding to a rate of occurrence of a malfunction of color-staining on the recording medium and casiness of the occurrence of a malfunction of color-staining.

Figure 14A:
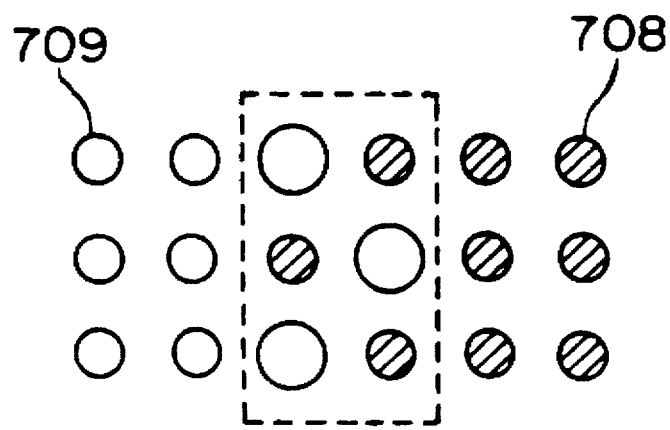
FIG. 14A and FIG. 14B are explanatory views which illustratively show by way of example a pattern of arrangement of dots to which each of the aforementioned embodiments can be applied, respectively.
Figure 14B:
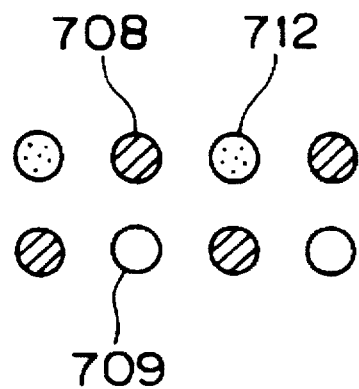

The ink jet color printing method of the present invention has been described above with respect to the case that two monochromatic ranges, i.e., a black-colored range and a yellow-colored range are located adjacent to each other. However, practical usage of the ink jet color printing method should not be limited only to the boundary between two monochromatic ranges and a peripheral range to the boundary. The ink jet color printing method of the present invention can be employed not only for the range where different ink-colored pixels 708 and 709 represented by a dotted line shown in FIG. 14A (e.g., a black-colored pixel and a yellow-colored pixel are arranged on the printing paper) but also for the range where three kinds of ink-colored pixels 708, 709 and 712 shown in FIG. 14B (e.g., a black-colored dot, a yellow-colored dot and a cyan-colored dot) in order to reduce an occurrence of color-staining. Specifically, the present invention can be applied not only to two colored dots located adjacent to each other as seen in one direction, e.g., in the main scanning direction of print head but also to two or more colored dots located adjacent to each other as seen in another direction, e.g., in the auxiliary scanning direction or in the slantwise orienting direction, whereby an image having no color-staining can be obtained corresponding to the conditions applied to formation of peripheral dots.

Figure 1A:
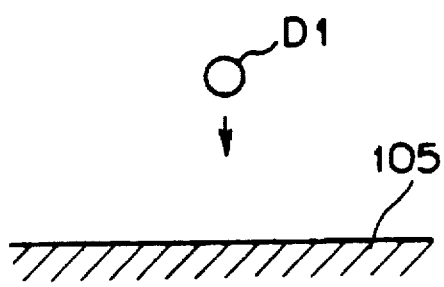
FIGS. 1A–1E comprise an explanatory view which illustratively explains a conventional multi-droplet system.
Figure 1B:
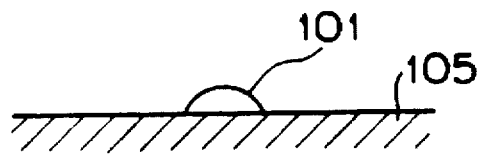
Figure 1C:
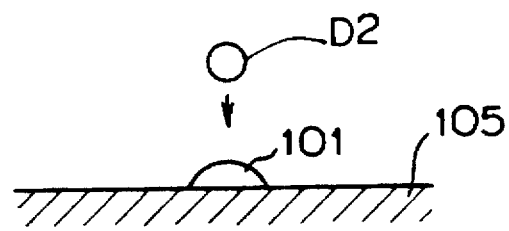
Figure 1D:
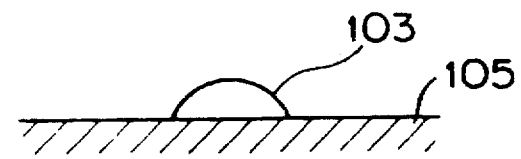
Figure 1E:
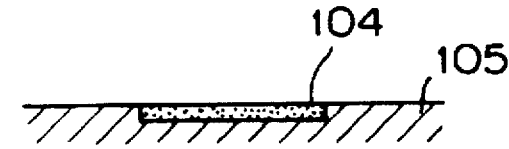
Figure 3:
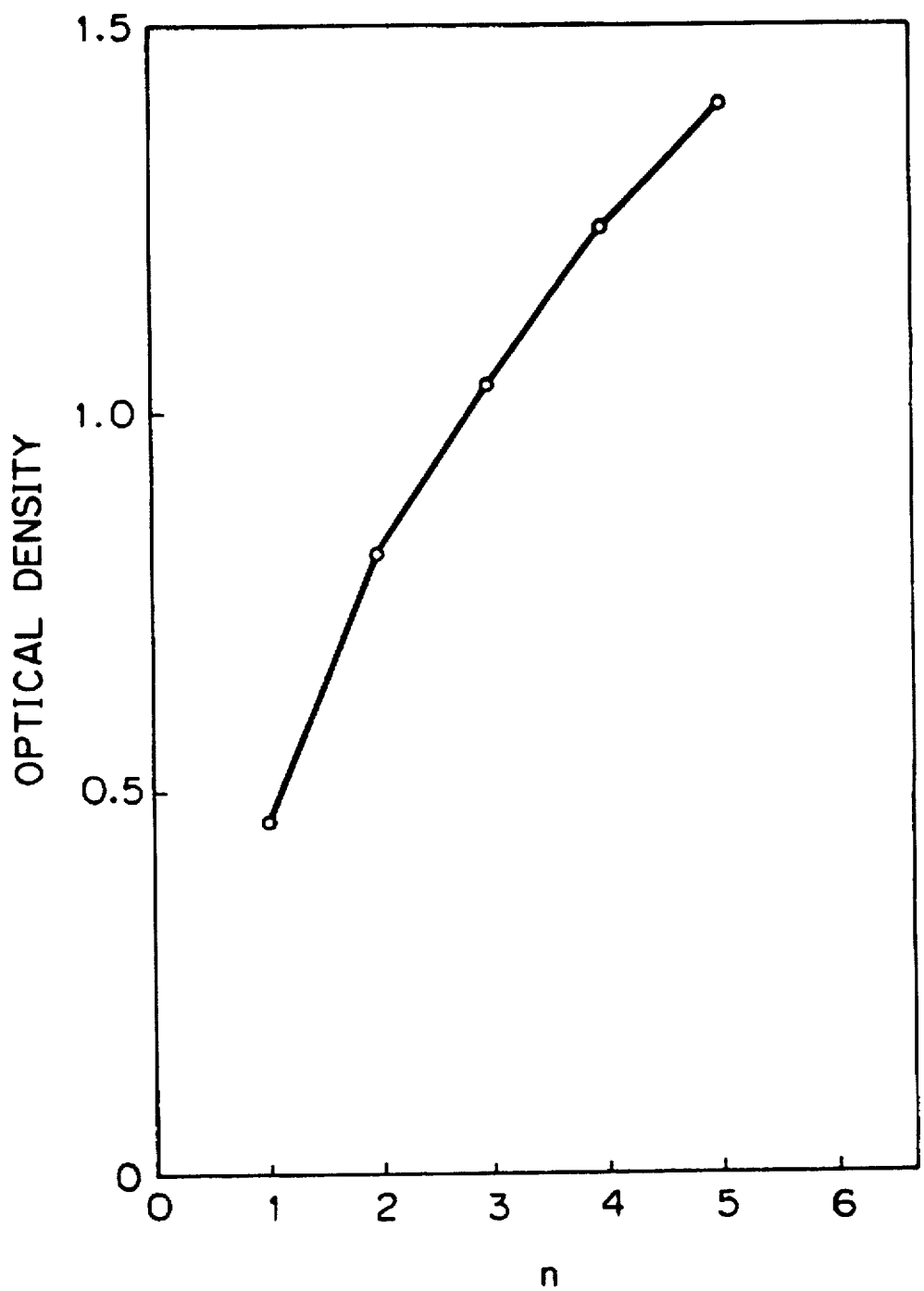
FIG. 3 is a graph which illustratively explains optical density properties of an image formed by employing the conventional multi-droplet system.
Figure 4:
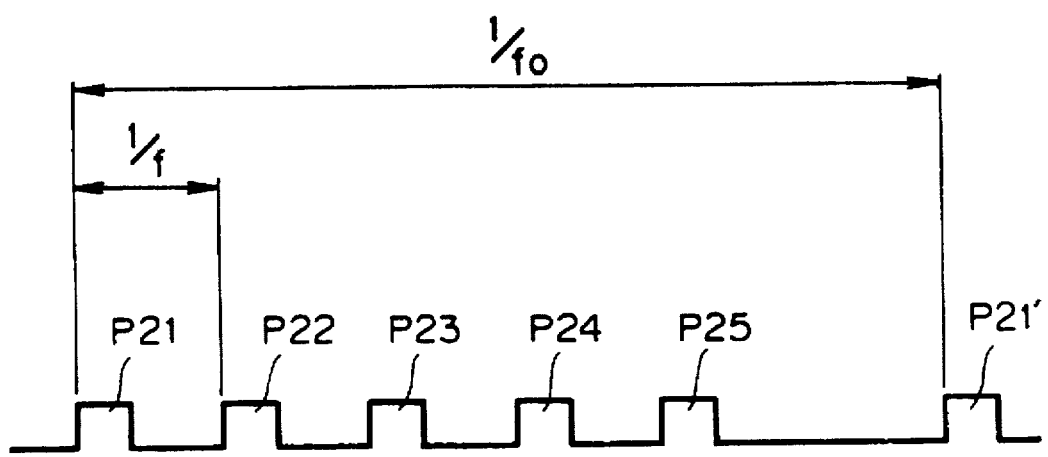
FIG. 4 is a schematic wave shape diagram which illustratively explains a series of ejection signals generated by employing the conventional multi-droplet system.
Figure 10:
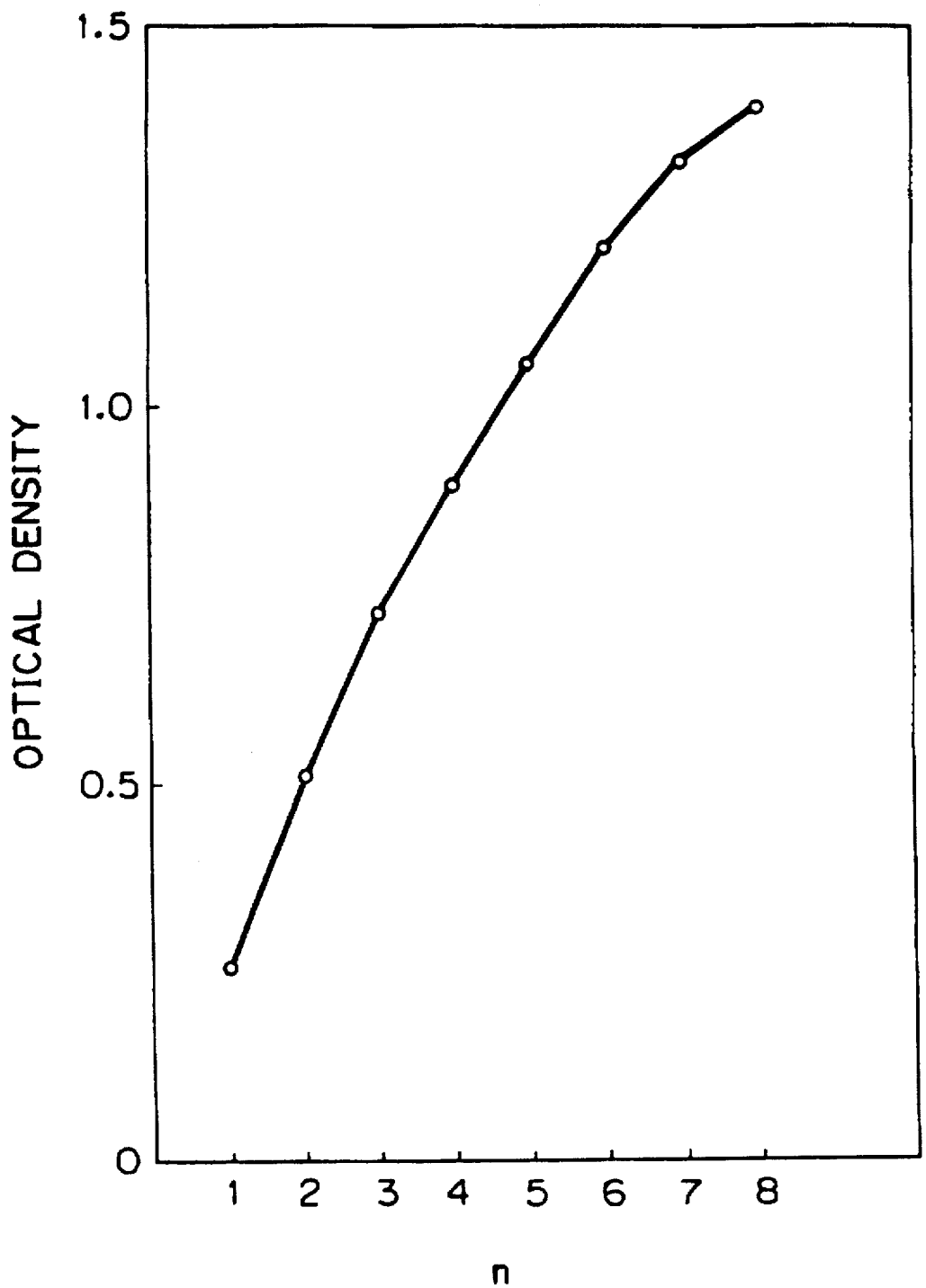
FIG. 10 is a graph which illustratively explains optical density properties of an image formed in accordance with a conventional multi-drop system.
Figure 12G:
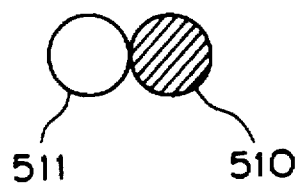
Figure 13G:
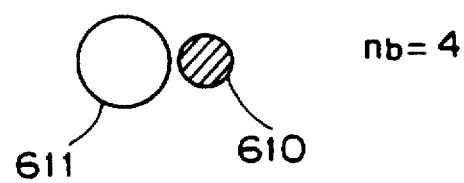

In addition, the method of the embodiment relates to a limitative determination of the number of liquid droplets in the case that the dot is to be formed with the maximum number of liquid droplets, and presents the result that the number of liquid droplets n in a property of optical density variation as shown FIG. 3 or FIG. 10 can be made smaller, that is, the result that the dot is formed within a range that linear relationship between the optical density variation and the number of liquid droplets n is maintained Accordingly, the present embodiment makes it possible not only to prevent different colored inks from mixing but to smooth a variation of gradation according to the variation of the number of liquid droplets.

Figure 15:
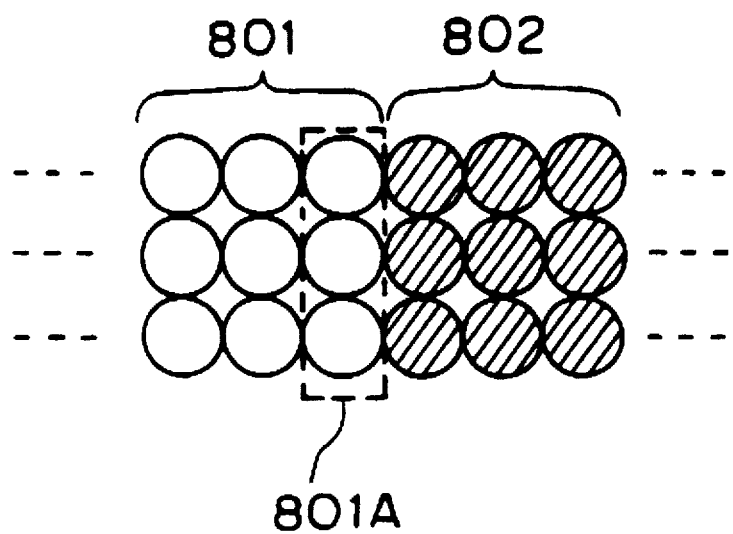
FIG. 15 is an explanatory view which illustratively explains a dot forming method to be practiced in accordance with further modified embodiment modified from the first embodiment of the present invention.

Further, the present invention can advantageously be applied not only to a so-called multi-droplet system wherein a single dot having a different size is formed by shooting a plurality of liquid droplets onto the recording medium at a single location but also to the case that a single pixel is formed with a plurality of dots. For example, in the case that a single pixel is formed in the shape of a matrix of 3×3 so that pixels 801 and 802 each having a different color are located adjacent to each other as shown in FIG. 15, it is acceptable that the state of forming three dots involved in a range 801A of the pixel 801 located adjacent to the pixel 802 is properly controlled. Provided that one dot is formed with one liquid droplet, it is acceptable that a controlling operation is performed such that no dot is formed in the range 801A. In addition, provided that one dot is formed with a plurality of liquid droplets in the overlapped state in the same manner as the multi-droplet system, it is also acceptable that a diameter of each dot in the range 801A is properly adjusted.

The present invention has been described above with respect to the case that a plurality of inks each having a different color are used for practicing the colored ink jet printing method. Additionally, the present invention can equally be applied not only to the case that each printing operation is performed using plural kinds of inks each having a largely different color tone but also to the case that each printing operation is performed using plural kinds of inks each having a different density, e.g., ink having a high density, ink having a low density or the like.

Further, the present invention should not be limited only to the foregoing embodiment wherein a color of each ink and a density of the same are combined with each other, and moreover, various values representing the combination made among the ink color, the ink density and other factors are used for achieving each printing operation. It is acceptable that the ink jet color printing method of the present invention is selectively employed only when a malfunction of color-staining occurs on an image depending on the number of liquid droplets to overlap each other for forming one dot per each ink color.

Next, description will be made below with respect to an ink jet printing apparatus for practicing the embodiments of the present invention.

Figure 16:
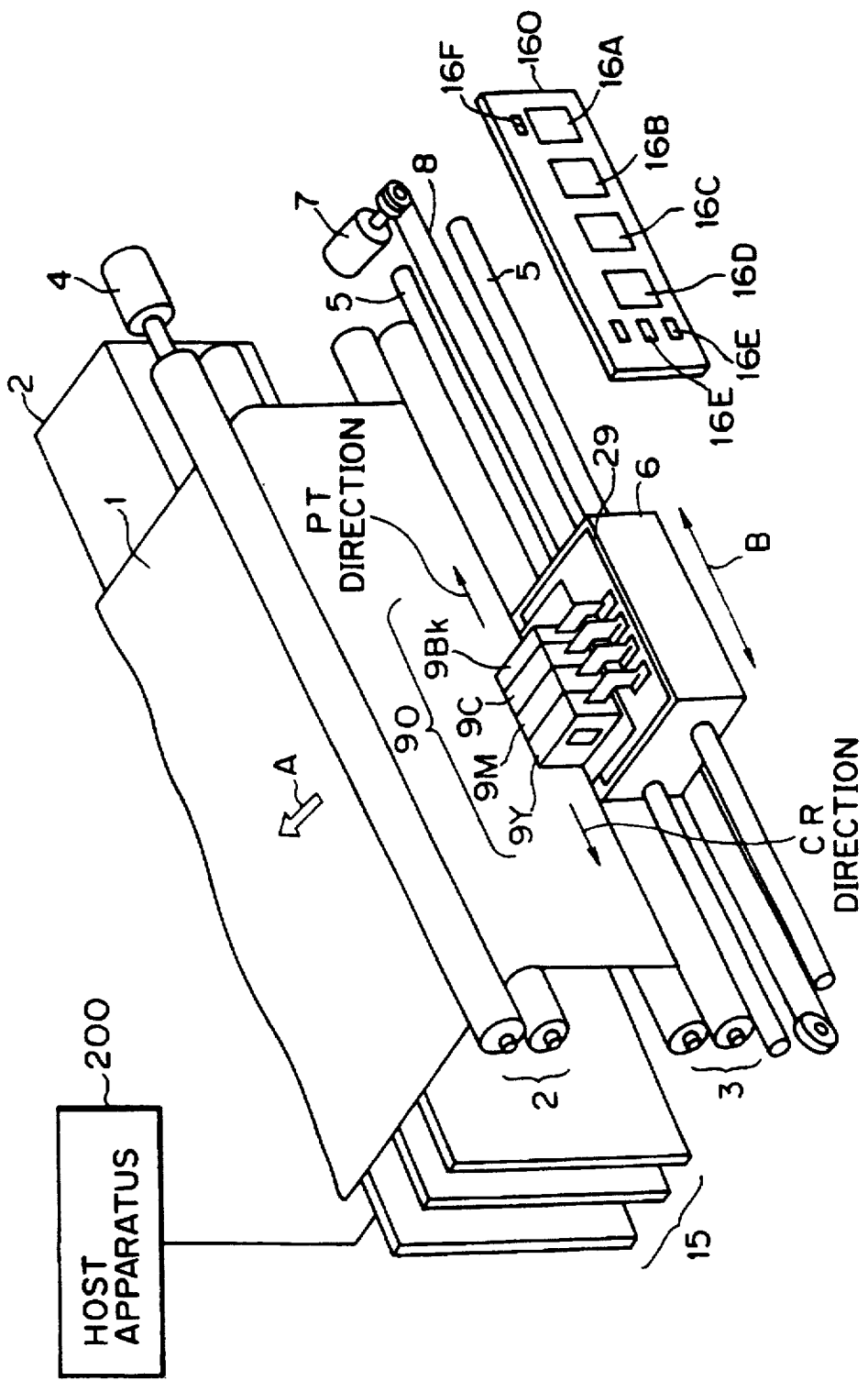
FIG. 16 is a schematic perspective view which schematically shows the structure of an ink jet printing apparatus to which each of the aforementioned embodiments can be applied.

FIG. 16 shows by way of example the structure of a colored ink jet recording apparatus including a plurality of electrothermal converting elements as energy generating means for generating energy to be utilized for ejecting ink from a printing head unit to be described later.

Referring to FIG. 16, a printing medium 1 such as a sheet of paper, a sheet of plastic material or the like is supported by conveying rollers 2 and 3 composed of a pair of rollers disposed above and below a printing range so that it is conveyed in the A arrow-marked direction as the conveying roller 2 is rotationally driven by a sheet feeding motor 4. A pair of guide shafts 5 are arranged in front of the conveying rollers 2 and 3 while extending in parallel with the latter. A carriage 6 is reciprocably displaced in the B arrow-marked direction along the guide shafts 6 with the aid of a wire 8 as a carriage motor 7 is rotationally driven.

A printing head unit 90 is mounted on the carriage 6. The printing head unit 90 is used for forming a colored image and includes four printing heads 9 arranged in the side-by-side relationship in the scanning direction, i.e., a printing head 9C disposed corresponding a cyan ink, a printing head 9M disposed corresponding a magenta ink, a printing head 9Y disposed corresponding to a yellow ink and a printing head 9Bk disposed corresponding to a black ink. A printing head having a plurality of ink ejection outlets (e.g., thirty two ink ejection outlets, one hundred twenty eight ink ejection outlets or the like) formed thereon in the equally spaced relationship in the vertical direction is disposed on the front surface of the printing head, i.e., the surface facing the printing medium 1 with a predetermined gap (e.g., 0.8 mm) kept therebetween.

The ink jet color printing apparatus includes a controlling section formed on a control base board 15 on which a control circuit (prepared in the form of a central processing unit (hereinafter referred to as CPU)), a read only memory (hereinafter referred to as ROM), a random access memory (hereinafter referred to as RAM) and others are arranged. The controlling section receives a command signal and a data signal (information for each printing operation to be performed) from a host unit 200, and subsequently, in response to these signals, a certain magnitude of driving voltage (heating voltage) for each of the electrothermal converting elements is applied to each of the printing heads 9A to 9D via a heat driver 13, and a driving power source for each motor is supplied.

A key setting section including an online/offline shift key 16A, a line feed key 16B, a form feed key 16C, a recording mode shifting key 16D and others and a displaying section including a plurality of alarm lamps 16E, a power source lamp 16F and others are arranged on an operation panel 160 attached to an exterior case (not shown) for the ink jet color printing apparatus.

Figure 17:
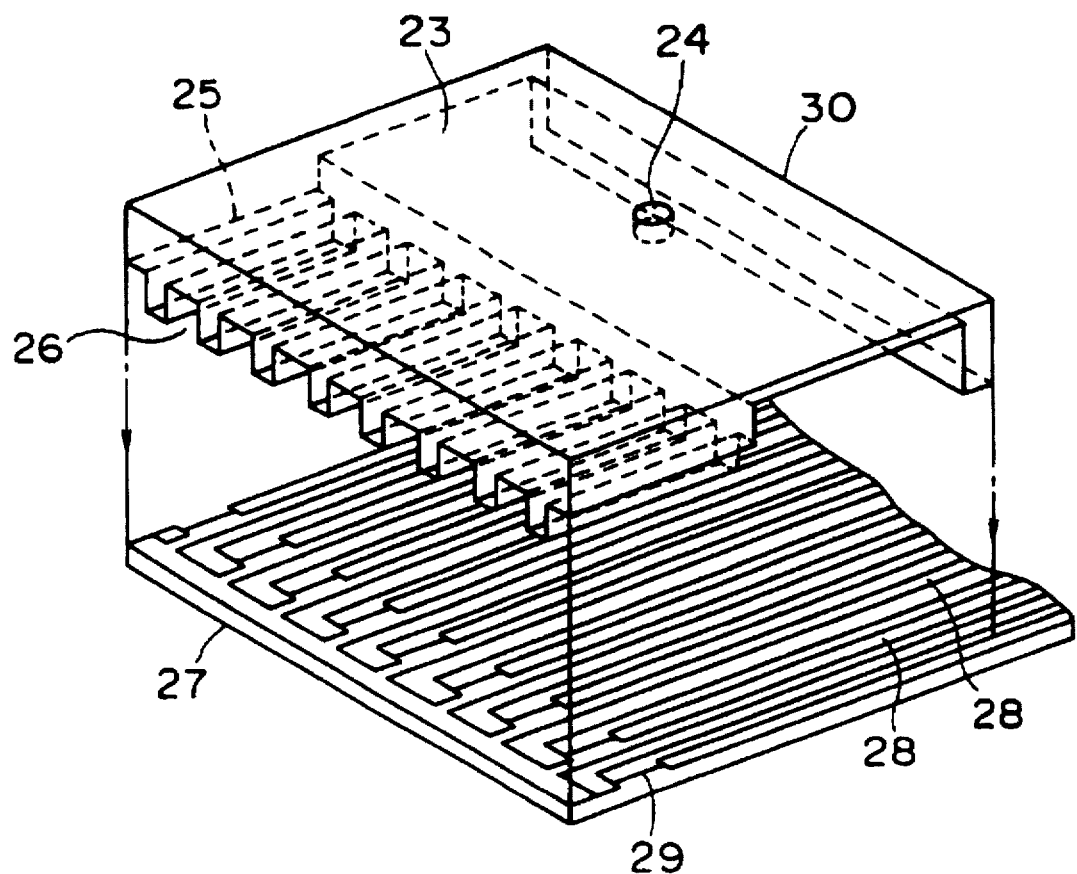
FIG. 17 is a schematic perspective view which shows by way of example the structure of a print head for the ink jet printing apparatus in the disassembled state.

FIG. 17 schematically shows by way of example the structure of the printing head 9. In the drawing, reference numeral 27 designates a heater board. A plurality of electrothermal converting elements (ejection heaters) 29 and a plurality of wiring conductors 28 made of aluminum or a similar metallic material to feed electricity to the electrothermal converting elements 29 are formed on a silicon substrate constituting the heater board 27 by employing a film forming process. Subsequently, a ceiling plate 30 having a plurality of partition walls formed thereon to define a plurality of liquid paths 25 is adhesively placed on the heater board 27 to build an integral structure, whereby an ink jet printing head is fabricated.

Printing liquid (ink) is introduced into a common liquid chamber 23 via a feed port 24 formed through the ceiling plate 30, and thereafter, it is distributively conducted to the respective liquid paths 25 from the common liquid chamber 23. When the electrothermal converting elements 29, i.e., the heaters generate heat as electricity is fed to them, gas bubbles are generated in the ink filled in each liquid path 25, causing an ink droplet to be ejected from each ejection outlet 26.

Figure 18:
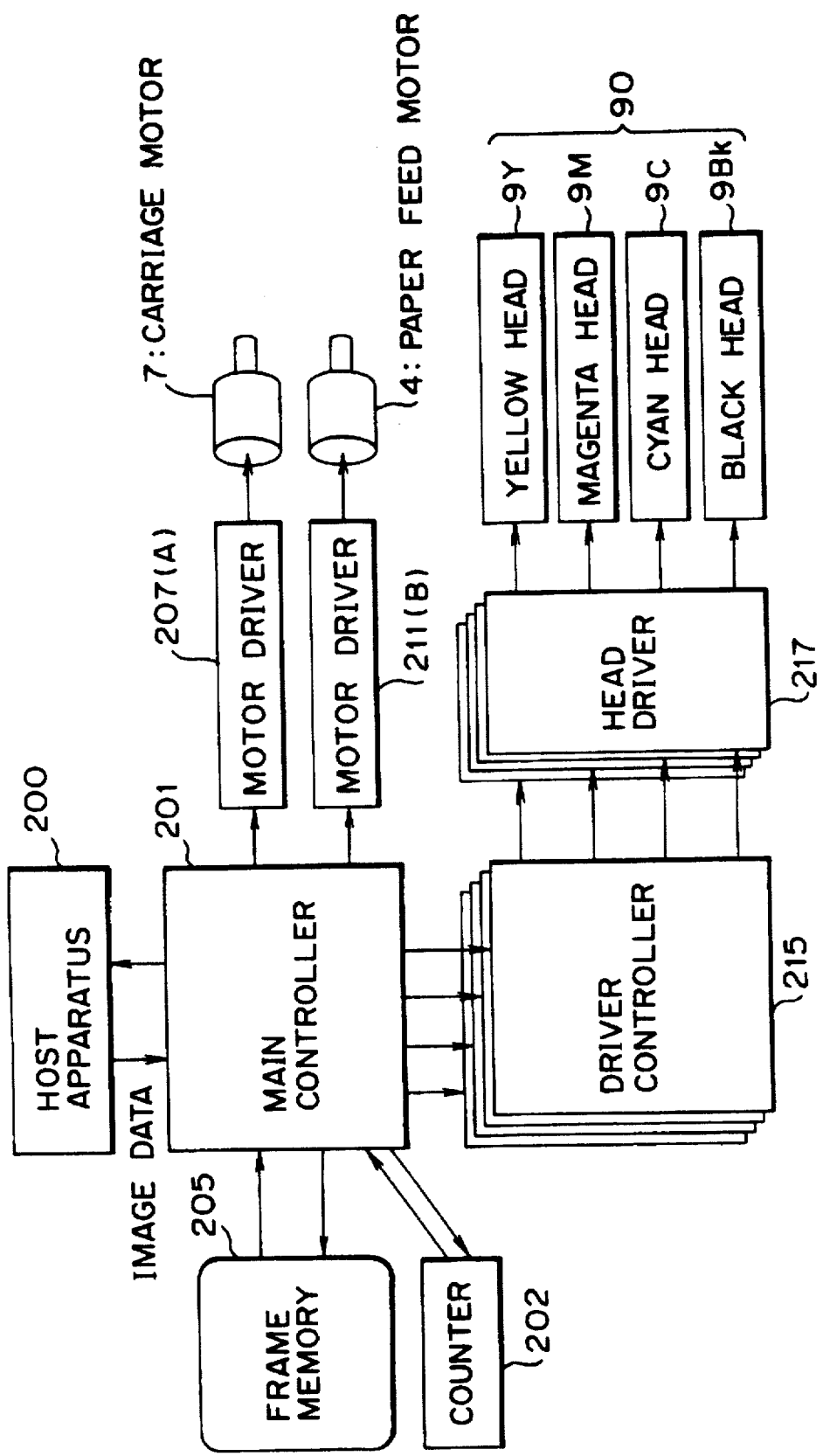
FIG. 18 is a block diagram which shows another embodiment of a controlling system for the ink jet printing apparatus shown in FIG. 16.

FIG. 18 is a block diagram which schematically shows the arrangement of a plurality of circuits in a controlling system for the ink jet color printing apparatus. The control system includes a main controller 201 in which CPU for executing a procedure of processings (to be described later with reference to FIG. 19) for controlling essential components constituting the ink jet color printing apparatus, ROM having a program corresponding to the procedure of processings and other fixed data stored therein and RAM for achieving various kinds of operations are involved. In addition, the main controller 201 includes a counter 202. In response to a signal outputted from a host unit 200 via the main controller 201 to represent image data inclusive of data for each ink color, a buffer frame memory 205 stores these data therein.

In operation, the main controller 201 controls the driving of the carriage motor 7 via a motor driver 207, and moreover, controls the driving of the sheet feeding motor 4 via a motor driver 211. In addition, based on the image data for each ink color read from the frame memory 205, the main controller 201 controls the ejection of liquid droplets from the recording heads 9Y, 9M, 9C and 9Bk via a driver controller 215 and a head driver 217 in accordance with the procedure shown in FIG. 19 in order to record an image having a high quality on the recording medium without any occurrence of color-staining.

Figure 19:
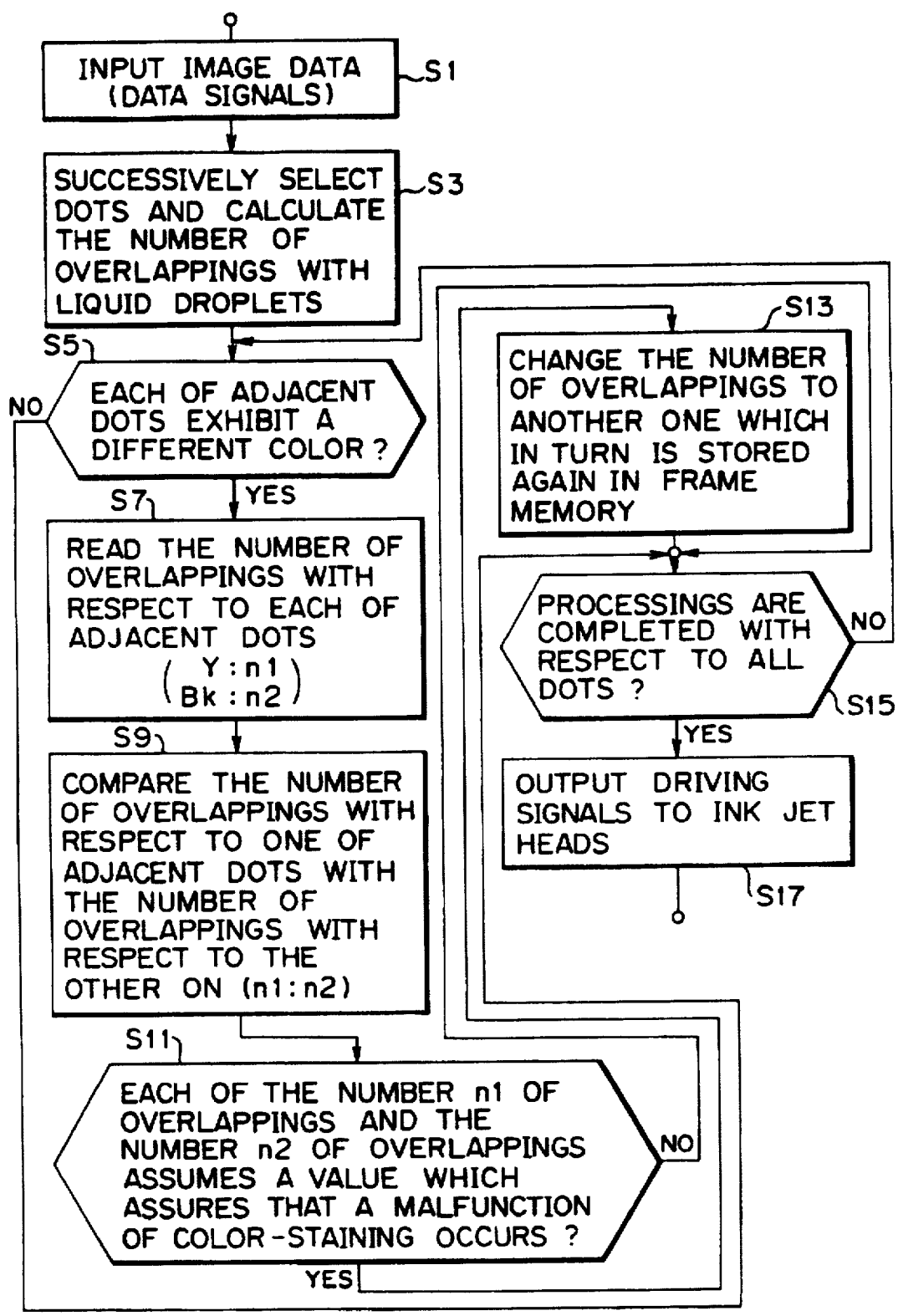
FIG. 19 is a flowchart which shows by way of example a procedure of changing the number of liquid droplets to be ejected in accordance with each of the aforementioned embodiments.

FIG. 19 is a flowchart which illustratively shows by way of example a procedure of processings for changing the number of liquid droplets to overlap each other by operating the ink jet color printing apparatus, and the foregoing processings are executed as operations for processing the image data stored in the frame memory 205. To simplify description on the procedure of processings to be executed, the description will be made below with reference to the embodiment shown in FIG. 11.

First, in Step S1, the image information stored in the frame memory 205 are inputted into the main controller 201, and thereafter, the program goes to Step S3 in which the main controller 201 successively selects dots and calculates the number of liquid droplets to overlap each other corresponding to data representing the thus selected dots, and subsequently, the results derived from the calculation are rearranged on the frame memory 205. Next, in Step S5, the main controller 202 selects a dot and then determines whether or not this dot and another dot located adjacent to the first-mentioned dot are formed by inks each having a different color (e.g., Y and Bk). When it is found that the result obtained in Step S5 is Yes, the program goes to Step S7 in which the main controller 201 reads the number of overlappings with respect to the foregoing dots located adjacent to each other, and subsequently, the program goes to Step S9 in which the main controller 201 compares the two dots with each other. For example, with respect to the two adjacent dots which are presently taken into account, when it is assumed that one of them is formed with yellow ink and the calculated number of overlappings is n1 and the other one is formed with black ink and the calculated number of overlappings is n2, the main controller 201 compares n1 and n2 with each other.

Next, in Step S11, the main controller 201 determines based on the result obtained from the foregoing comparison whether or not a malfunction of color-staining occurs when a printing operation is performed with the aforementioned number of overlappings (n1, n2). When it is found that the result obtained from the determination in Step S11 is Yes, the program goes to Step S13 in which the number of overlappings is changed such that the number of liquid droplets should limitatively be defined with respect to at least one of the two dots in such a manner as not to allow a malfunction of color-staining to occur. For example, when description is made with respect to the embodiment shown in FIG. 11, a value representing the calculated number of overlappings n1 (e.g., "7") is combined with another value representing the calculated number of overlappings n2 (e.g., "6"), and thereafter, the first-mentioned value n1 is changed to another value of n1' (e.g., "4") which assures that a malfunction of color-staining does not occur. This value n1' is stored again in a predetermined range of the frame memory 201. It is recommendable that values for limitatively defining the number of liquid droplets which assures that a malfunction of color-staining does not occur are preliminarily stored in ROM of the main controller 201, e.g., as fixed data in the form of a table corresponding to each color.

In the case that it is determined after completion of the processing in Step S13 that the number of overlappings is limitatively defined in such a manner as not to allow a malfunction of color-staining to occur with two adjacent dots or in the case that it is determined in Step S11 that the number of lapping is limitatively defined in the same manner as mentioned above or in the case that it is determined in Step S5 that each of the two adjacent dots exhibit a same color, the program goes to Step S15 in which it is determined whether or not processings are completed with respect to all the dots. When it is found that the result obtained from the foregoing determination is No, the program returns to Step S5 so as to repeat the processings in Step S5 and subsequent ones. On the contrary, when it is found that the foregoing result is Yes, the program goes to Step S17 in which the main controller 201 outputs data to the driver controller 215 which in turn drives the recording head 9 via the head driver 217.

Although description has been made above with respect to the embodiment shown in FIG. 14, it of course is obvious that the present invention can equally be applied to the embodiments described above with reference to FIG. 12 to FIG. 15.

(A second embodiment)

In the first embodiment of the present invention as mentioned above, the total number of liquid droplets to be formed on the printing medium is limitatively determined. In contrast with the first embodiment, in this embodiment, an average quantity of liquid droplets representing a quotient obtained by dividing a total quantity of liquid droplets required for forming a dot by the number of liquid droplets is limitatively determined. This construction is advantageously applicable to the case that the number of liquid droplets shot onto the printing medium can be increased because when dots are formed on a printing medium having an excellent quality in ink penetration, it is rare to form a large liquid droplet 103 not penetrated into the printing medium as shown in FIG. 1. In other words, when an average quantity of liquid droplets is taken as a reference for controllably preventing a malfunction of color-mixing from arising when dots are formed on the printing medium, this makes it possible to freely make combination among numbers of liquid droplets. For example, to properly correct the linearity of variation of an optical density as shown in FIG. 3 and others, the number of liquid droplets can be controlled.

The second embodiment of the present invention will concretely be described below with reference to FIG. 20.

Figure 6:
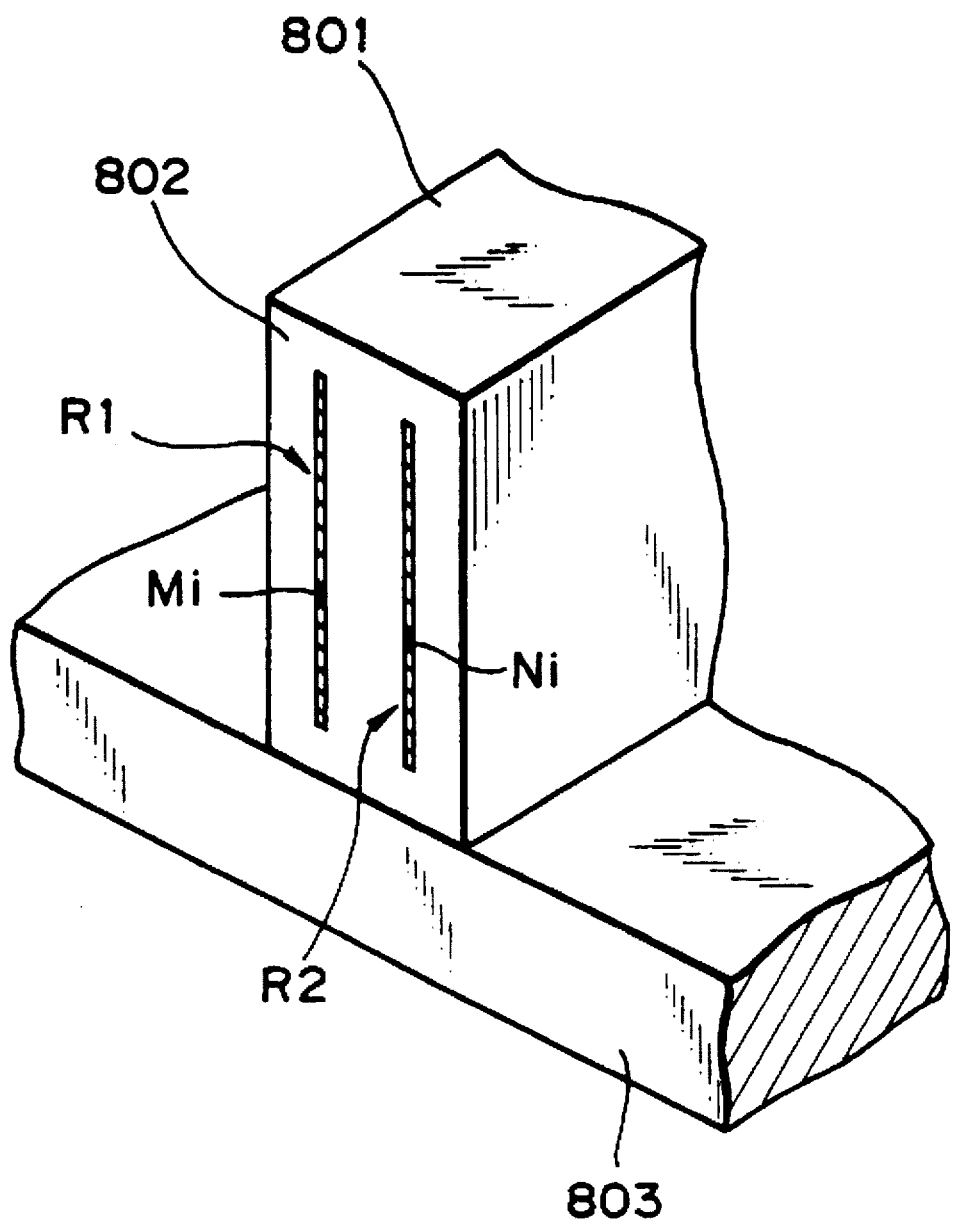
FIG. 6 is a schematic perspective view which schematically shows the structure of a conventional ink jet printing head.
Figure 7:
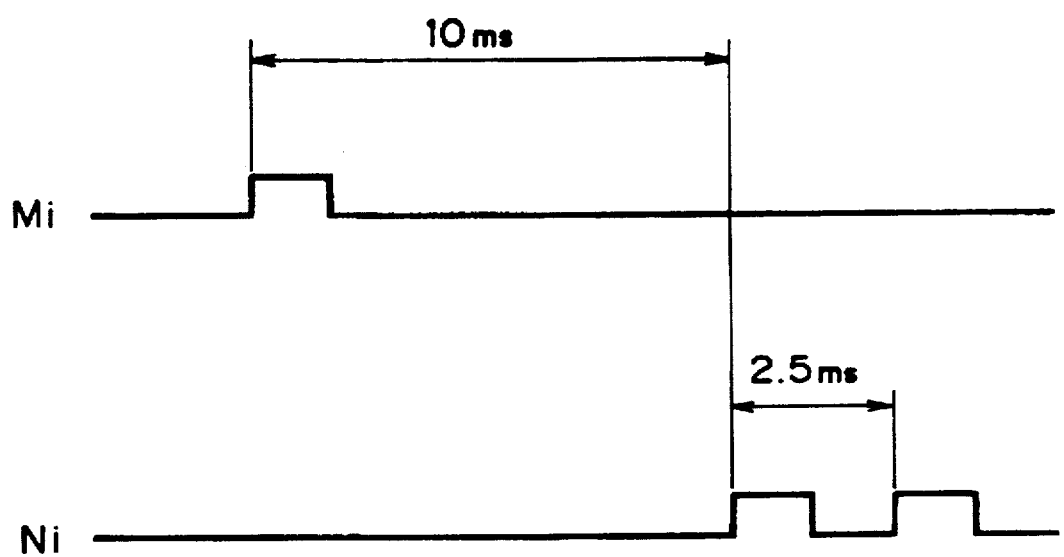
FIG. 7 depicts wave shape diagrams which show by way of example signals for driving the conventional ink jet printing head shown in FIG. 6.

This embodiment is realized based on the assumption that an ink jet head is constructed as shown in FIG. 6 to FIG. 8. Specifically, a single dot can be formed by using liquid droplets which are ejected from different ejection outlets and which have different quantities from each other. In this embodiment, assuming that the number of liquid droplets ejected from the ejection outlet of lesser droplet quantity is n1 and that of more droplet quantity is n2, a set of (n1=3, n2=2) and a set of (n1=5, n2=0) are preliminarily determined to represent the number of liquid droplets required for a largest dot on the printing medium.

Same gradation is realized by the dots found in the above-stated both sets of liquid droplets. In this connection, an average quantity of liquid droplets to overlap each other at a substantially same location is represented by about 5 pl and about 7 pl corresponding to the ejection outlet of lesser droplet quantity and the ejection outlet of more droplet quantity, respectively. In practice, the foregoing sets of combinations are selectively used for each of colors, and a set of (n1=5, n2=0) is selected for at least one of ink colors at least along the boundary between monochromatic ranges each having a different color and neighborhood of the boundary, whereby the average quantity of liquid droplets representing a quotient obtained by dividing a total quantity of liquid droplets required for forming a dot limitativety determined. In this embodiment, similarly to the first embodiment, it is preferable to decrease the average quantity of ink of higher brightness.

Specifically, with respect to a black color and a yellow color, in the case that a largest dot is formed on the printing medium based on image data by combination of liquid droplets represented by a set of (n1=3, n2=2), when dots are formed while the foregoing state is unchangeably maintained, the black-colored dot and the yellow-colored dot come in contact with each other, causing a malfunction of color-mixing to arise. To cope with the foregoing malfunction, a set of (n1=3, nb=2) is selected for the black-colored range so that an average quantity of each liquid droplet is determined to assume a value of about 6 pl so as to form a largest dot 910. On the other hand, with respect to a yellow color, a largest dot is formed in other colored range in which same ink colors are adjacent to each other by using a set of (ny1=3, ny2=2), while a dot 911 is formed with an average quantity of each liquid droplet set to about 5 pl in the range located adjacent to the foregoing range. Consequently, a pixel can be formed on the printing medium without any occurrence of a malfunction of color-staining induced by color-mixing after penetration of the liquid droplet into the printing medium and gray levels of dots of the both sets are made to be same as each other.

In this embodiment, i.e., in the case that a size of each liquid droplet is increased to such an extent that liquid droplets comes in contact with each other directly before completion of penetration of inks each having a different color, when a set of (n1=3, n2=2) is used for each of a black color and a yellow color, an average quantity of at least one ink-colored liquid droplet is determined to assume a value smaller than a normally employed value, resulting in an image being obtainable not only without an occurrence of a malfunction of color-staining along the boundary between the adjacent ranges each having a different ink color but also without any deterioration of a quantity of image.

In the case of an example as shown in FIG. 20, a combination made among numbers of liquid droplets is changed only with respect to a yellow color. In addition, it is acceptable that a combination made among numbers of liquid droplets is changed with respect to both of a black color and a yellow color as shown in FIG. 21. In the contrast with the method shown in FIG. 20, it is also acceptable that a set of (ny1=3, ny2=2) is employed for the yellow color, and moreover, a set of (nb1=5, nb2=0) is employed for the black color as shown in FIG. 22.

Figure 23:
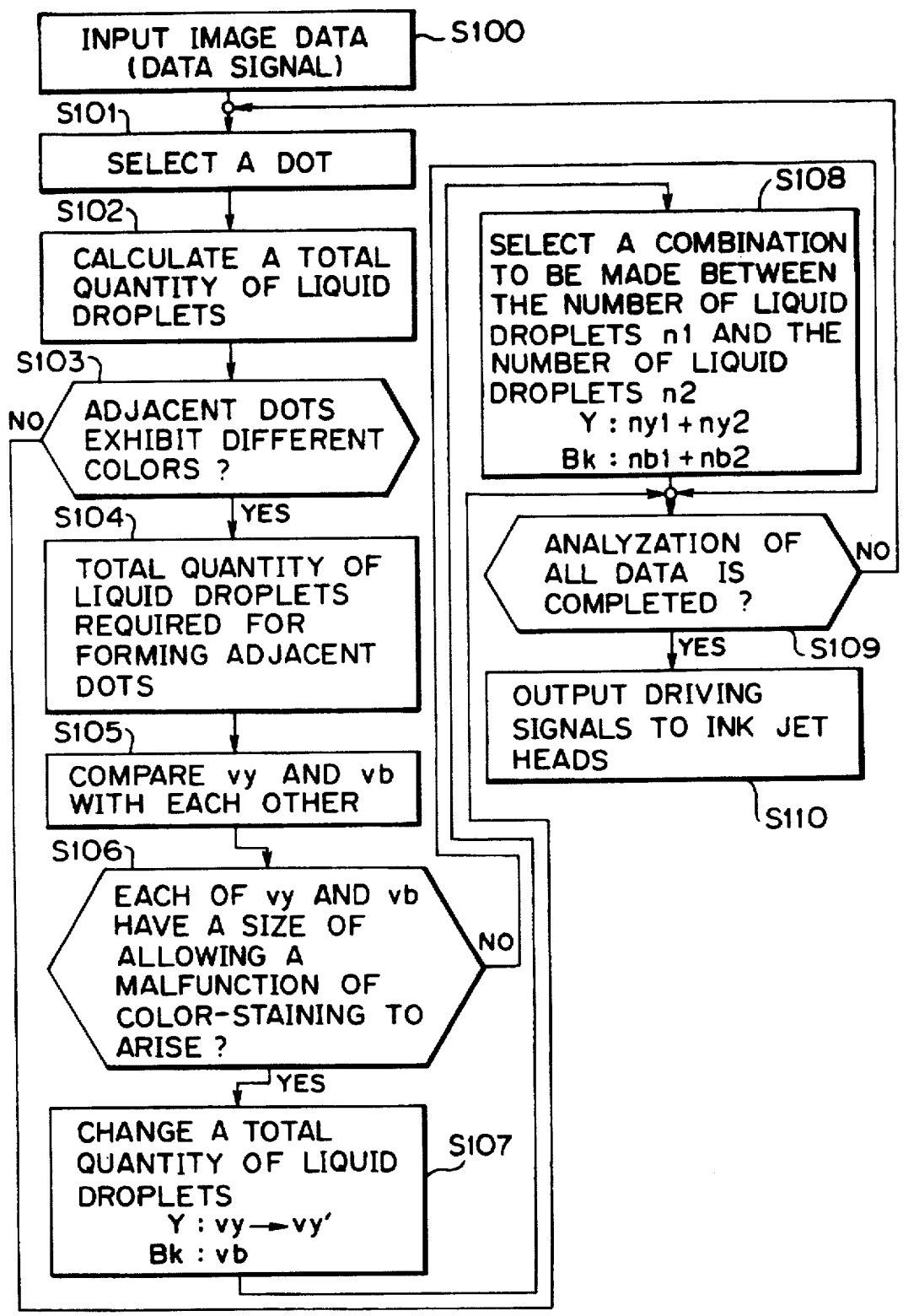
FIG. 23 is a flowchart which shows a procedure of determining a quantity of liquid droplets required for forming dots shown in FIG. 20.

FIG. 23 is a flowchart which shows a procedure of processings to be executed by practicing the ink jet printing method shown in FIG. 20.

First, when an image information is inputted into an ink jet printing apparatus in Step S100, dots are selected in Step S101 and a total quantity of liquid droplets corresponding to the selected dots is counted in Step S102. Subsequently, the program goes to Step 103 in which it is determined whether or not dots located adjacent to each other exhibit a same color. When it is determined in Step 103 that the dots located adjacent to each other do not exhibit a same color, the program goes to Step S104 in which a total quantity of liquid droplets corresponding to the dots located adjacent to each other is calculated. On the contrary, when it is determined in Step 104 that the dots located adjacent to each other exhibit a same color, the program goes to step S109 in which a total quantity of liquid droplets corresponding to the dots located adjacent to each other is neither calculated nor compared. When the calculation operation in Step S104 is completed, the program goes to Step S105 in which the results obtained from the calculation operation are compared with each other. Subsequently, it is determined in Step S106 whether or not the total quantity of liquid droplets corresponding to the dots located adjacent to each other assumes a value for allowing a malfunction of color-staining to occur. When it is found that the result derived from the determination made in Step S106 is YES, the program goes to Step S107 in which the total quantity of liquid droplets corresponding to the dots located adjacent to each other is changed to another one, and thereafter, the program goes to Step S108 in which a combination to be made among numbers of ink droplets is selected. On the contrary, when it is found that the result derived from the determination made in Step S106 is NO, neither changing nor selecting as mentioned above is executed but the program goes directly to Step S109. When all the data are completely analyzed by repeating Step S100 to Step S109, the program goes to Step S110 in which a printing operation is started by activating the ink jet printing head.

The second embodiment of the present invention has been described above with respect to the case that the monochromatic range having a black color and the monochromatic range having a yellow range are located adjacent to each other. However, it is not necessary that practical use of the ink jet printing method to be practiced in accordance with the second embodiment of the present invention should not be limited only to the boundary between both the monochromatic ranges and the location peripheral to the boundary in the same manner as the first embodiment of the present invention.

This embodiment is concerned with an ink jet printing method of temporarily changing an average quantity v of liquid droplets represented in terms of a ratio of a total quantity of liquid droplets to be shot onto a substantially same location to the number of liquid droplets in the case that a malfunction of color-staining is remarkably recognized with inks each having a different color, e.g., along the boundary between adjacent monochromatic ranges on an image. However, it is acceptable that an average quantity of liquid droplets to be preset is individually determined for each of ink colors. Additionally, on the assumption that a plurality of average quantities of liquid droplets v2, v3 and others are preliminarily determined in addition to an average quantity of liquid quantity v1, it is also acceptable that averages quantities of liquid droplets v2, v3 and others are selectively used depending on a color-staining rate of the printing medium and easiness of an occurrence of color-staining varying from image to image.

Practical use of the second embodiment of the present invention should not limitatively be determined depending on a combination made among ink colors and numerals associated with the foregoing combination. The ink jet printing method to be practiced in accordance with the second embodiment of the present invention may selectively be used only in the case that a malfunction of color-staining arises on an image due to color-mixing. According to the second embodiment of the present invention, desired advantages can be obtained without any necessity for limitatively defining a pattern of arrangement of dots or pixels.

In this embodiment, a method disclosed in Japanese Patent Application Publication No. 63-502261 is employed as a method of modulating a quantity of ejected liquid droplets. The ink jet printing method to be practiced in accordance with the second embodiment of the present invention is not realized only in combination with the method disclosed in Japanese Patent Application Publication No. 63-502261 but advantages of the present invention can reliably be obtained in combination with a method disclosed in Japanese Patent Application Laying-Open Nos. 59-207265 and 57-160654 as well as a method of modulating a quantity of liquid droplets before the latter are shot on the printing medium. Additionally, a method of controlling a quantity of each liquid droplet in accordance with a third embodiment of the present invention can be applied to the second embodiment of the present invention.

(A third embodiment)

Figure 24:
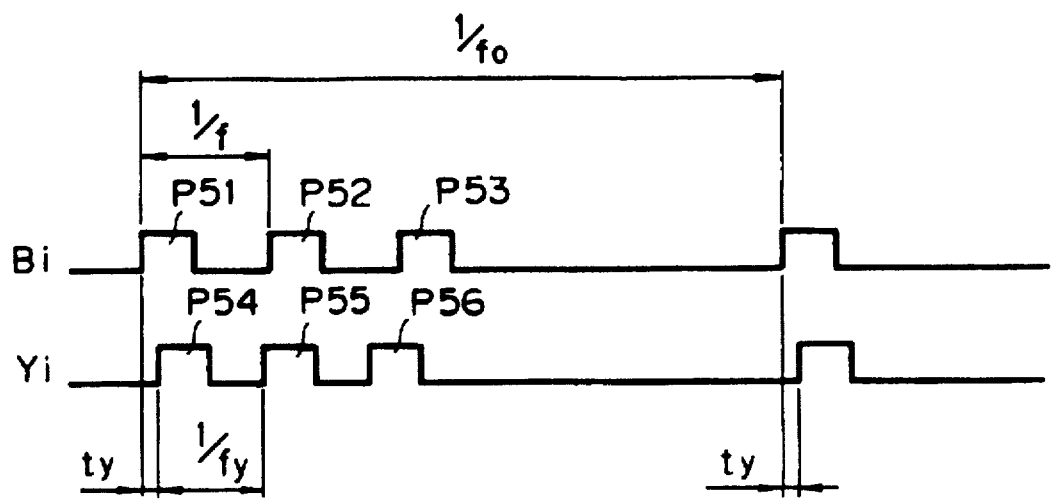
FIG. 24 is a wave shape diagram which shows a method of applying an ejection signal in accordance with a third embodiment of the present invention.
Figure 25:
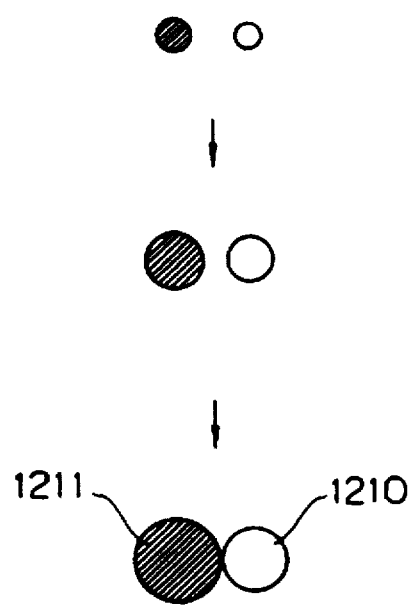
FIG. 25 is an explanatory view which explains how dots are formed by employing the signal applying method shown in FIG. 24.

FIG. 24 and FIG. 25 explain a process of forming a black-colored dot and a yellow-colored dot at positions adjacent to each other on the recording medium by applying a further embodiment of the present invention.

A characterizing feature of the present embodiment consists in preventing an image from being stained with mixed colored-inks by setting a maximum value of ejection frequency to a value specific to each colored-ink on the assumption that the relationship between an ejection frequency and a volume of each liquid droplet associated with an ink jet printing method is taken into account. In this embodiment, an ink jet head capable of continuously and stably ejecting liquid droplets each having a volume of about 10 pl at an ejection frequency of f=2.5 KHz is used for practicing the ink jet printing method.

Figure 26:
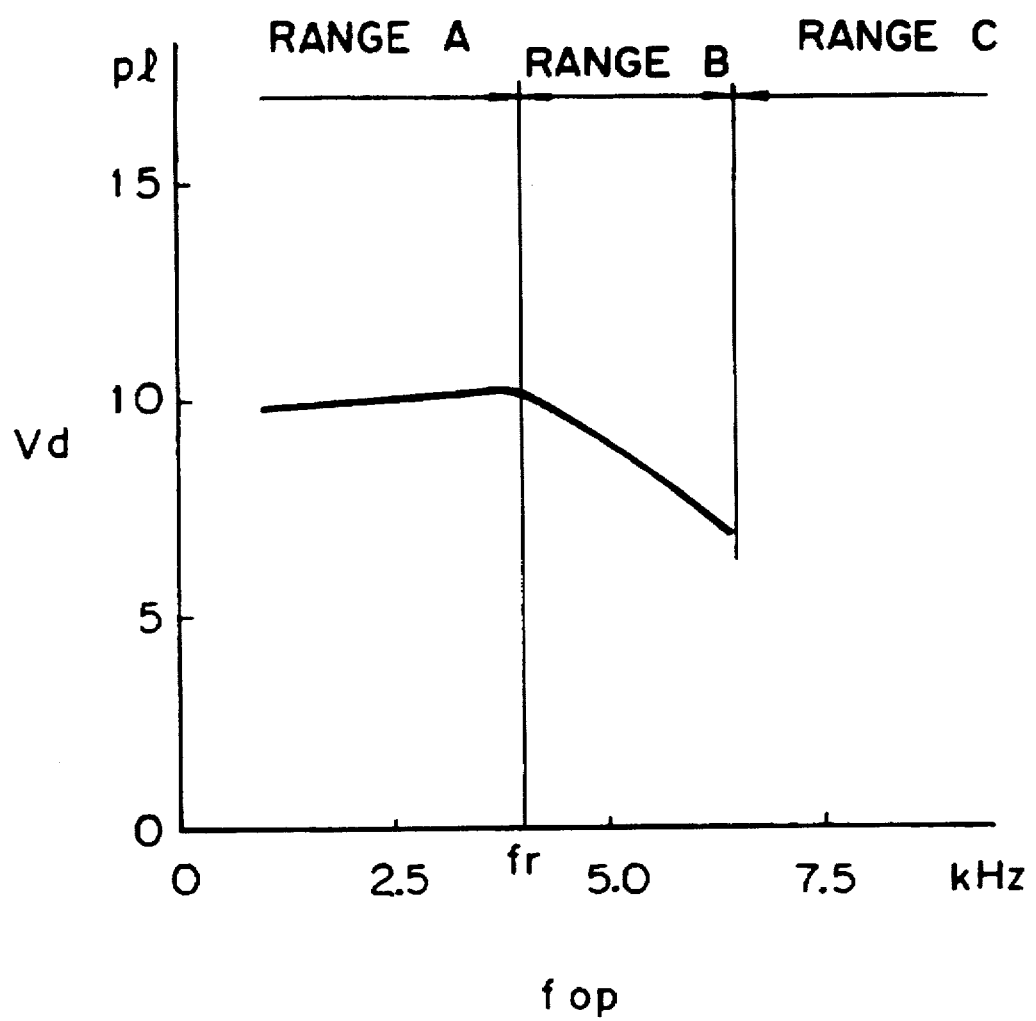
FIG. 26 is a graph which explains the relationship between a frequency of each ejection and a volume of liquid droplet.

Generally, the ink jet printing method has a tendency as shown in FIG. 26 in respect of a relationship between an ejection frequency fop, i.e., a frequency of each ejection signal to be applied to an energy generating element disposed in each ejection outlet and a volume Vd of each liquid droplet to be ejected from the ejection outlet.

This tendency is remarkably recognizable in the case that ink droplets are continuously ejected from the ink jet head. In FIG. 26, reference character fr designates a refill frequency that is a reciprocal of a shortest time period as counted until the meniscus once retracted in the rearward direction as liquid droplets are ejected from the ink jet head is restored to the position in the proximity of an ejection outlet. In this embodiment, the ink jet head has a refill frequency of fr=4.0 KHz.

Referring to an example shown in FIG. 26, in the case that the ejection frequency fop is equal to the refill frequency fr or less (A range), each liquid droplet has a volume of 10 to 11 pl, and this liquid droplet volume is kept substantially constant or gently increases. Such increasing of the liquid droplet volume as mentioned above is remarkably recognizable in the case that liquid droplets are simultaneously ejected from, e.g., an ink jet head having many ejection outlets as counted per unit area wherein a heat generating element is used for the ink jet head as an energy generating element.

In contrast with the A range where a volume of each liquid volume is kept stable, in the case that the ejection frequency fop is larger than the refill frequency fr (B range), ejection of each liquid droplet from the ink jet head becomes unstable, causing an average volume of each liquid droplet to be reduced compared with the case that the ink jet head is driven in the A range. When the ejection frequency fop is increased further in such a manner that it is represented by, e.g., an inequality of fop $\geq$ 7.0 KHz (C range), there sometimes arises an occasion that continuous liquid ejection becomes impossible, resulting in liquid ejection failing to be executed.

Although it is possible to continuously eject liquid droplets from the ink jet head not only in the A range but also in the B range, when each dot is normally formed, the ejection frequency in the A range where liquid droplets are comparatively stably ejected from the ink jet head is preferably selected.

In this embodiment, the fop vs. Vd properties as mentioned above are used for the ink jet head, and as shown in FIG. 24 and FIG. 25, a black colored liquid droplet is ejected from the ink jet head in response to ejection signals P51, P52 and P53 applied to the ink jet head at a normal ejection frequency which is equal to the refill frequency or less, causing a pixel 1211 to be formed on the printing medium. On the contrary, a yellow-colored liquid droplet is ejected from the ink jet head in response to ejection signals P54, P55 and P56 applied to the ink jet head at an ejection frequency fy which is larger than the normal ejection frequency f=2.5 KHz but equal to the refill frequency fr=4.0 KHz or more of each ejection outlet of the ink jet head.

At this time, when it is assumed that the ejection frequency fy is set to a predetermined value as represented by, e.g., an equation of fy=5.0 KHz, a volume of each yellow-colored liquid droplet can be reduced based on the properties shown in FIG. 26 to such an extent that the yellow-colored liquid droplet does not come in contact with a black-colored liquid droplet on the printing medium. Consequently, a black-colored pixel 1211 and a yellow-colored pixel 1210 located adjacent to each other are completely formed by way of the aforementioned steps, resulting in an image having an excellent quality being obtainable with reduction of a malfunction of color-staining.

The ink jet printing method to be practiced in accordance with this embodiment is concerned with a printing method of temporarily changing the ejection frequency from the normal value f to the value fy which is preliminarily set to be larger than the normal value f in the case that a malfunction of color-staining arising between different ink colors is remarkably recognized, e.g., along the boundary between monochromatic ranges on a certain image. In this connection, a maximum value of the ejection frequency to be preliminarily set may individually be determined for each of the ink colors. It is, however, preferable that the higher brightness an ink color has, with the lesser amount of ink droplets a dot of the ink color is formed, that is, at the greater ejection frequency an ink droplets of the ink color are ejected.

In addition, with respect to a single ink color, a plurality of ejection frequencies f1, f2 and others may be determined in addition to the normal ejection frequency f in such a manner as to allow the ejection frequencies f1, f2 and others to be selectively used depending on a rate of color-staining occurring on a printing medium, a rate of color-staining occurring on an image, and a degree of easiness of an occurrence of color-staining. For example, an ink jet system as used in the present embodiment has such properties that a volume of ejected liquid droplet increases due to elevation of the temperature of an ink jet head itself, resulting in the refill frequency of the ink jet system being reduced. In this connection, it is thinkable that the ejection frequency of the ink jet system is selected in conformity with the f vs Vd properties determined depending on the temperature of an ink jet head adapted to eject liquid droplets each having a different ink color in order to assure that a volume of each ejected ink droplet varies, causing an occurrence of color-staining on an image to be reduced.

As is apparent from the above description, it can be prevented that a quality of image is undesirably degraded by determining a maximum ejection frequency of each ejected liquid droplet for each of ink colors and then selectively using the maximum ejection frequency corresponding to the kind of image.

(A first modified example of the third embodiment)

Figure 27:
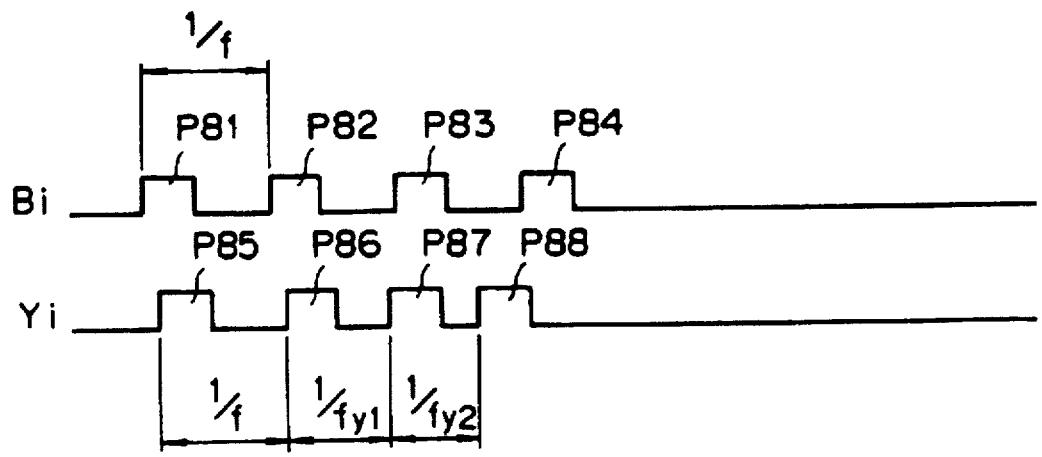
FIG. 27 is a wave shape diagram which illustratively shows a method of applying an ejection signal in accordance with a modified embodiment modified from the third embodiment of the present invention.

FIG. 27 is a schematic view of an ink jet printing method to be practiced in accordance with an embodiment modified from the third embodiment, showing that a series of ejection signals are outputted from a controlling unit to a printing head.

Especially, in this modified embodiment, FIG. 27 explains a process of forming a dot formed on a printing medium with four black-colored liquid droplets and a dot formed on the printing medium with four yellow-colored liquid droplets in the positional adjacent relationship. In this modified embodiment, each ejection signal is applied to an ejection outlet Yi adapted to eject yellow-colored liquid droplets with time interval each two ejections being successively decreased.

Specifically, an ejection frequency f in the normal operative state and ejection frequencies fy1 and fy2 each larger than the refill frequency fr (where an inequality of fr<fy1≦fy2 is established among fy, fy1 and fy2) are set, and moreover, a time interval between ejection signals P85 and P86 is set to 1/f in the same manner as comparative example and a time interval between ejection signals P86 and P87 as well as a time interval between ejection signals P87 and P88 are see to 1/fy1 and 1/fy2. In this modified embodiment, the refill frequency fr is set to 4.0 KHz, while the ejection frequencies fy1 and fy2 are set to 4.5 KHz and 5.5 KHz.

The fop vs VP properties shown in FIG. 26 are remarkably recognized in the B range when the return of a meniscus to an ejection outlet adapted to continuously eject liquid droplets therefrom does not match with the time when an ejection signal is applied to the printing head. In this modified embodiment, however, a volume of each liquid droplet can be varied to a small extent for a short time by quickly shortening the ejection time interval of each liquid droplet ejected from the ejection outlet Yi, causing the displacement of the meniscus to become unstable. Thus, an occurrence of color-staining can be prevented by relatively reducing a size of each of a black-colored dot and a yellow-color dot located adjacent to each other on the printing medium so as not to allow both the dots to be combined with each other in the mixed-color state.

(A second modified example of the third embodiment)

Figure 28:
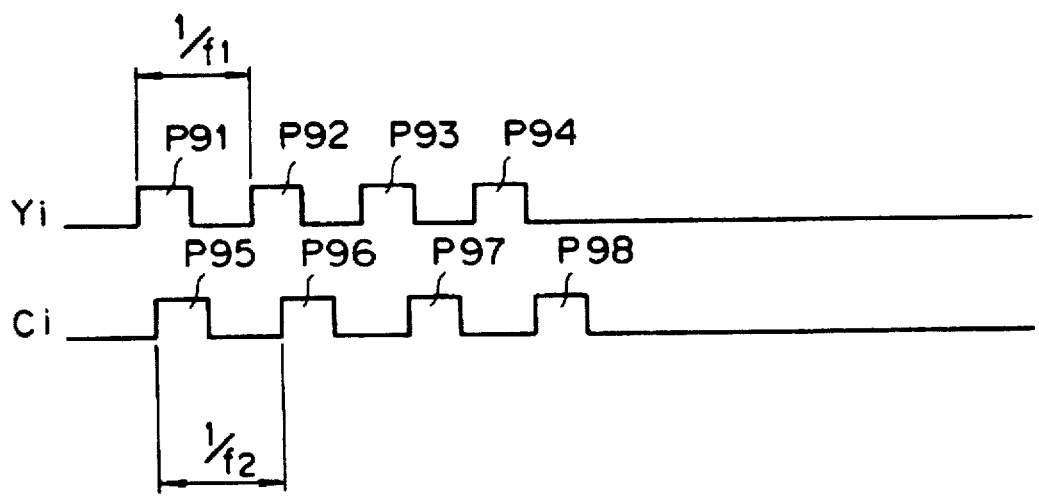
FIG. 28 is a wave shape diagram which illustratively shows a method of applying an ejection signal in accordance with another embodiment modified from the third embodiment of the present invention.
Figure 29:
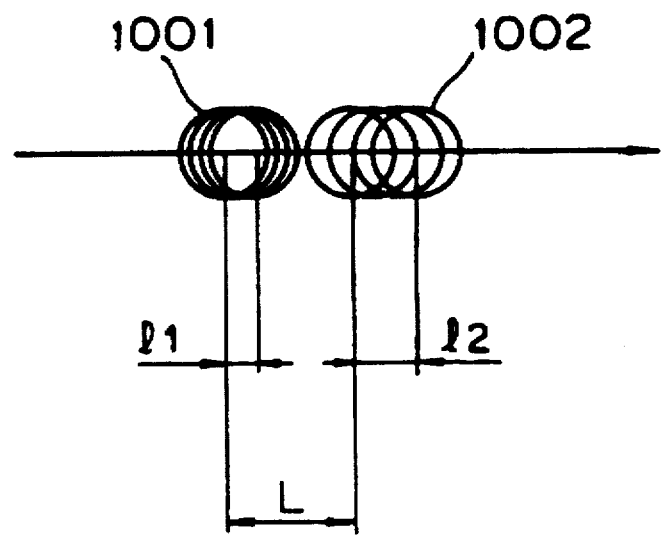
FIG. 29 is an explanatory view which illustratively explains the state that dots are formed in accordance with further embodiment modified from the third embodiment of the present invention.

FIG. 28 and FIG. 29 show by way of illustrative views an ink jet printing method to be practiced in accordance with another embodiment modified from the third embodiment, respectively.

This modified embodiment is concerned with a method of controlling a size of each dot itself by adequately selecting an ejection frequency so as to form a difference between the time when a liquid droplet is shot onto a printing medium and the time when a subsequent liquid droplet is shot onto the printing medium.

Especially, in the case that a scanning speed of the printing head on the printing medium is sufficiently high and a quantity of displacement of the printing head relative to the printing medium at a time interval of ejection of each liquid droplet is large, according to this modified embodiment, there is provided an ink jet printing method which assures that an occurrence of staining of an image with colored inks can be prevented by selecting an ejection frequency regardless of a refill frequency.

Figure 30:
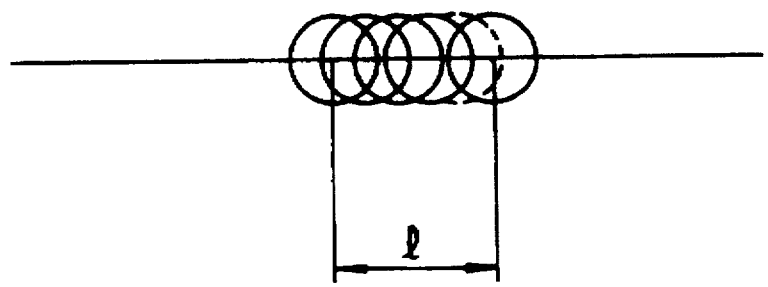
FIG. 30 is an explanatory view which illustratively explains the state that dots are formed in accordance with the modified embodiment shown in FIG. 29.

When a speed of displacement of the printing head relative to the printing medium is sufficiently high, a dot is formed on the printing medium with positions of formed dots being slightly shifted from each other as shown in FIG. 30. On the assumption that a single dot is formed with n number of liquid droplets at an ejection frequency f, a distance l between shooting points of the foregoing number of liquid droplets on the printing medium is represented by the following equation.

$$l=(n-1)\times s/f$$

In FIG. 29, reference character L designates a distance between dots located adjacent to each other when the number of liquid droplets required for forming a single dot is one. In this modified embodiment, in the case that dots formed by inks each having a different color are located adjacent to each other, the distance l can be changed by adequately setting the ejection frequency f corresponding to each dot, so that a size of the formed dot can be controlled.

FIG. 28 explains by way of illustrative views a method of applying ejection signals to the printing head for forming a dot formed with four liquid droplets each having a yellow color and a pixel formed with four liquid droplets each having a cyan color on the recording medium wherein both the dots as shown in FIG. 29 are located adjacent to each other in the scanning direction of the printing head or the printing medium.

In response to ejection signals P91, F92, P93 and P94 applied to the printing head at an ejection frequency f, a yellow-colored pixel 1001 is formed on the printing medium. On the contrary, an ejection frequency f2 larger than an ejection frequency f1 is selected for each cyan-colored liquid droplet which in turn is ejected from the printing head to form a pixel 1002 while maintaining a predetermined distance L between both the pixels. At this time, the distance l1 between shooting points on the printing medium to form a pixel 1001 is represented by 3×s/f1, and the distance l2 between shooting points on the printing medium to form a pixel 1002 is represented by 3×s/f2. Thus, an occurrence of color-staining due to contact of both the pixels with each other can be prevented by adequately selecting the ejection frequencies f1 and f2.

It is not necessary that the ejection frequencies f1 and f2 are selected in such a manner as to assume a value larger than that of the refill frequency, provided that it is assured that the foregoing advantage can be obtained in accordance with this modified embodiment.

Incidentally, the present invention should not be limited only to the aforementioned embodiments which disclose a combination to be made among inks each having a different color and represent various numerals employable for carrying out the present invention. In addition, the printing method of the present invention may selectively be used only in the case that a malfunction of color-staining occurs on an image depending on the number of liquid droplets to be superimposed upon each other to form one dot for each of inks each having a different color. Additionally, according to the present invention, desired advantages can be obtained without any particular necessity for defining a pattern of arrangement of pixels on the recording medium.

(A third modified example of the third embodiment)

This embodiment is concerned with an ink jet printing method which assures that an image having an acceptable gray level can be obtained by selectively using an ejection frequency larger than a refill frequency while a relationship between an ejection frequency and a volume of each liquid droplet is taken into account to practice the ink jet printing method. Especially, an ink jet head capable of continuously and stably ejecting ink droplets each having a volume of about 10 pl at an ejection frequency of f=2.5 KHz while exhibiting properties as shown in FIG. 3 by employing a method of applying to the ink jet head ejection signals each having an ejection frequency equal to or less than the hitherto known refill frequency used therefor is employed for practicing the ink jet printing method in accordance with this embodiment.

Properties of the ink jet printing head used for practicing the ink jet printing method in accordance with this embodiment are same to those as shown in FIG. 26. It should be noted that in the case of this embodiment, the refill frequency of the ink jet head is set to fr=3.0 KHz.

Figure 32A:
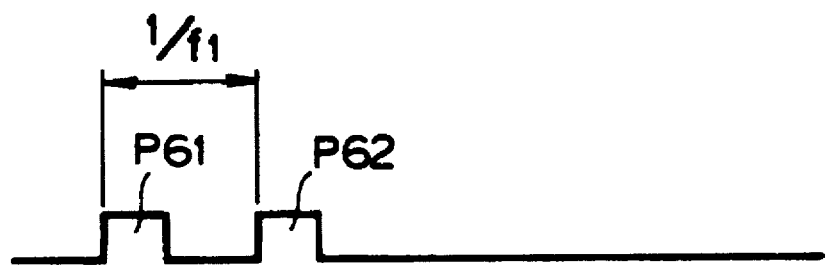
FIG. 32A to FIG. 32C are wave shape diagrams which illustratively show a method of applying an ejection signal corresponding to the liquid droplet ejection shown in FIG. 31A to FIG. 31C, respectively.
Figure 32B:
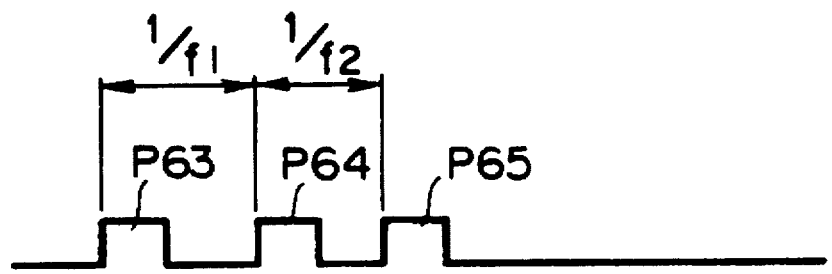
Figure 32C:
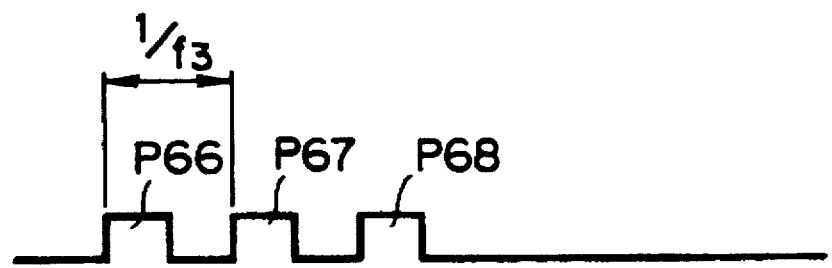
Figure 33A:
FIGS. 33A–33G comprise wave shape diagrams which illustratively show a method of applying an ejection signal in accordance with a modified embodiment modified from the third embodiment of the present invention.
Figure 33B:
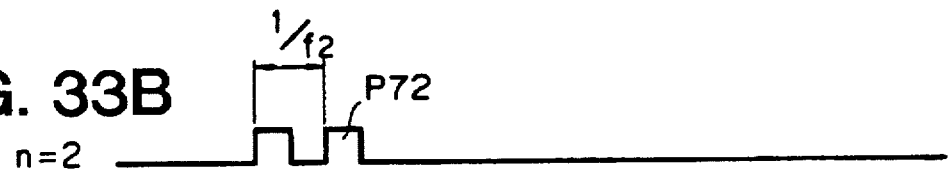
Figure 33C:
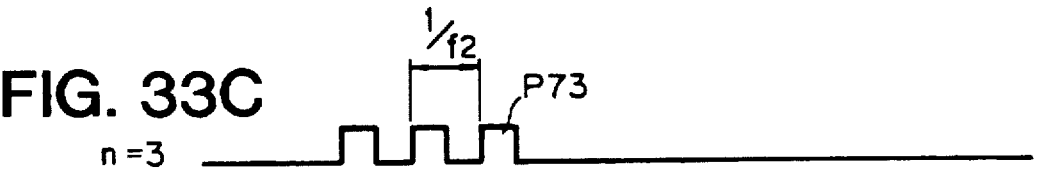
Figure 33D:
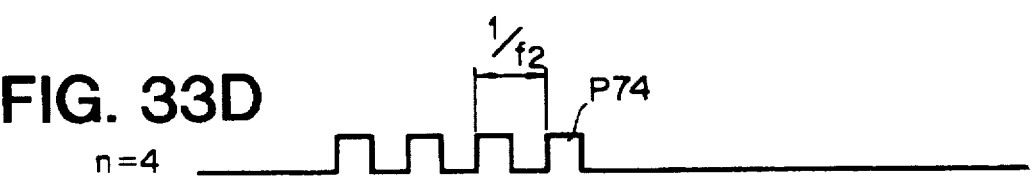
Figure 33E:
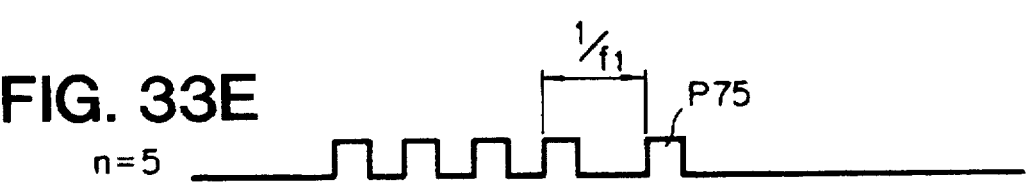
Figure 33F:
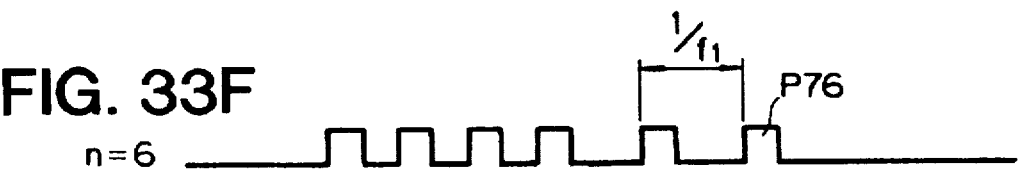
Figure 33G:
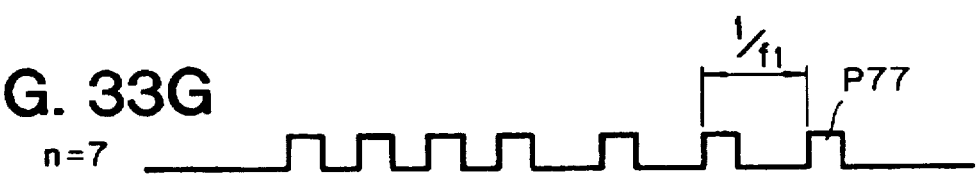

The fop vs Vd properties shown in FIG. 26 make it possible to obtain the ejection state as shown in FIGS. 31A–31D by employing a method of applying ejection signals shown in FIGS. 32A–32C to the ink jet head. Specifically, referring to FIGS. 32A–32C, when it is assumed that reference character fr designates a refill frequency, reference characters f1, f2 and f3 designate predetermined ejection frequencies each capable of ejecting ink therefrom, and an inequality of f1≦fr<f2<f3 is established among the aforementioned frequencies. While no ejection signal is applied to the ink jet head, a meniscus 505 in a liquid path 506 is kept stable in the proximity of a liquid path 506 as shown in FIG. 31D.

As shown in FIG. 32A, when two ejection signals P61 and P62 are applied to the ink jet head at a time interval of 1/f1, liquid droplets D51 and D52 are ejected from the ejection outlet 504 in response to the ejection signals P61 and P62 as shown in FIG. 31A. At this time, a volume of the liquid droplet D51 is substantially equal to a volume of the liquid droplet D52. In the case that three ejection signals P63, P64 and P65 are applied to the ink jet head at time intervals of 1/f1 and 1/f2 as shown in FIG. 32B, a volume of the liquid droplet corresponding to the ejection signal P63 is substantially equal to a volume of the liquid droplet corresponding to the ejection signal P64 but, as shown in FIG. 31B, a volume of a liquid droplet D55 corresponding to the ejection signal P65 is smaller than that of a liquid droplet D54 corresponding to the ejection signal P64. In the case that three ejection signals P66, P67 and P68 are continuously applied to the ink jet head at a time interval of 1/f3 as shown in FIG. 32C, a volume of each of ink droplets D57 and D58 corresponding to the ejection signals P67 and P68 is smaller than that of a liquid droplet corresponding to the ejection signal P66.

FIGS. 33A–33G illustratively explain an embodiment of the present invention wherein a method of applying ejection signals as explained in FIGS. 32A–32C to an ink jet head having the fop vs Vd properties as shown in FIG. 26 is used for practicing the foregoing embodiment.

In this embodiment, in the case that one dot is formed with a maximum number of seven liquid droplets by employing a multi-droplet system, when a refill frequency is set to fr≈3.0 KHz, ejection frequencies f1 and f2 are set such that the ejection frequency f1 assumes 2.5 KHz and the ejection frequency f2 assumes 5.5 KHz. Thus, the ejection frequencies f1 and f2 are selectively used corresponding to the number of liquid droplets required for forming one dot. For example, in the case that the number of ejection signals is represented by an inequality of n≧2, after an ejection signal P71 is applied to the ink jet head for ejecting a first liquid droplet to form one pixel therewith, an ejection signal P72 is applied to the ink jet head after a time of 1/f2 elapses, whereby a second liquid droplet is ejected from the ink jet head. At this time, a volume of the second liquid droplet is smaller than that of the first liquid droplet. Similarly, ejection signals P73 and P74 are applied to the ink jet head at a time interval of 1/f2 so that third and fourth liquid droplets are ejected from the ink jet head. After a time of 1/f1 elapses after the ejection signal P74 is applied to the ink jet head, an ejection signal P75 is applied to the ink jet head, causing a fifth liquid droplet to be ejected from the ink jet head. At this time, a volume of the fifth liquid droplet is larger than that of the fourth liquid droplet and substantially equal to that of the first liquid droplet. Similarly, ejection signals P76 and P77 are applied to the ink jet head at a time interval of 1/f1 so that sixth and seventh liquid droplets each having the substantially same volume as that of the first liquid droplet can be ejected from the ink jet head.

Figure 34:
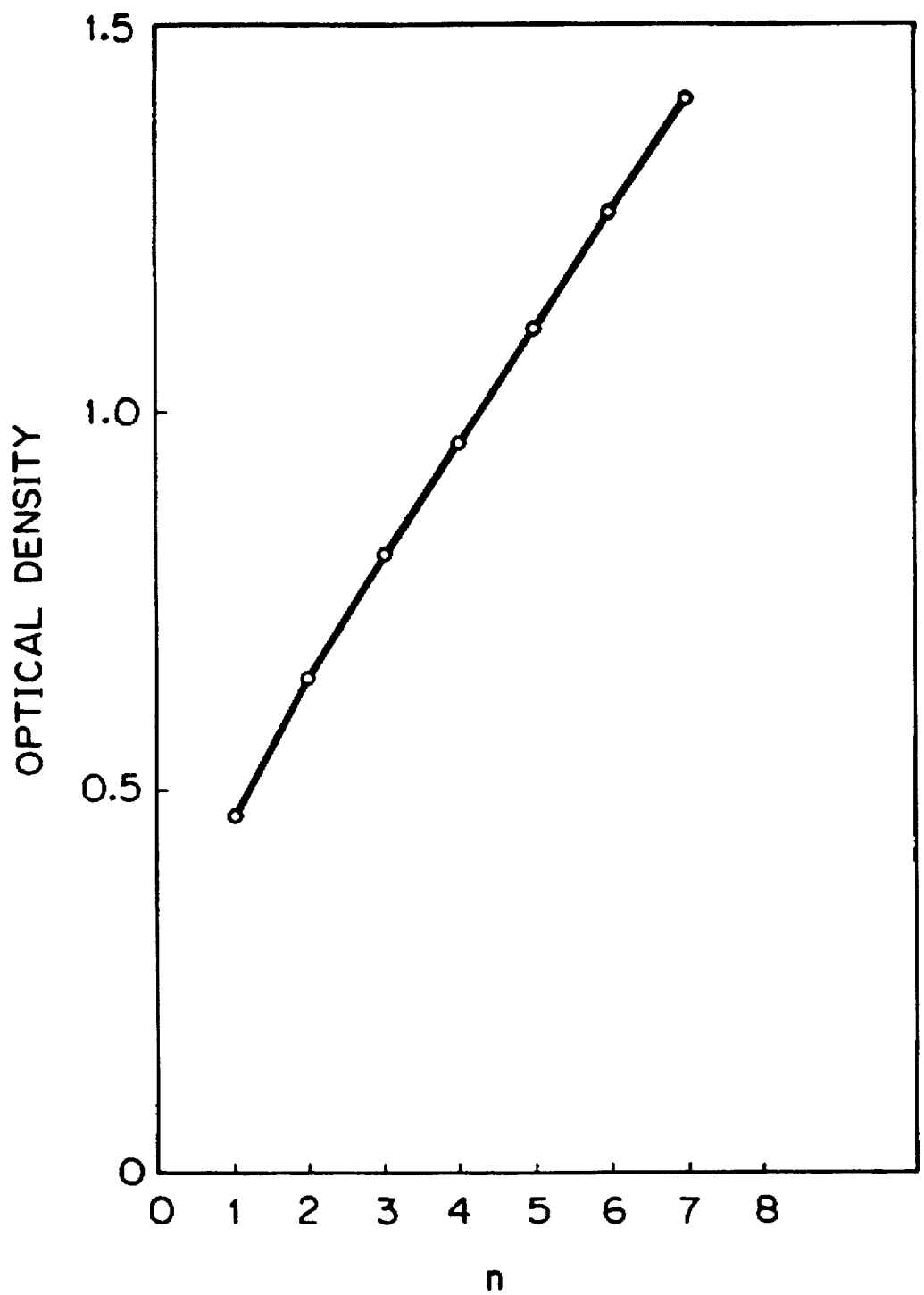
FIG. 34 is a diagram which illustratively explains optical density properties of the signal applying method shown in FIG. 33.
Figure 35A:
FIGS. 35A–35H comprise wave shape diagrams which illustratively show a method of applying an ejection signal in accordance with other modified embodiment modified from the third embodiment of the present invention.
Figure 35B:
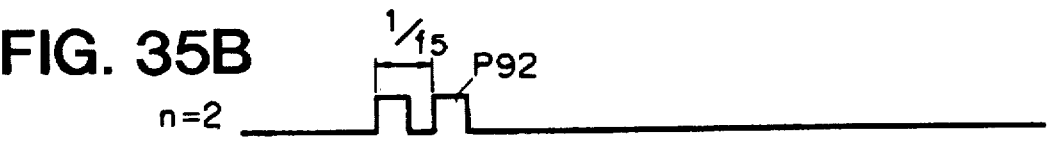
Figure 35C:
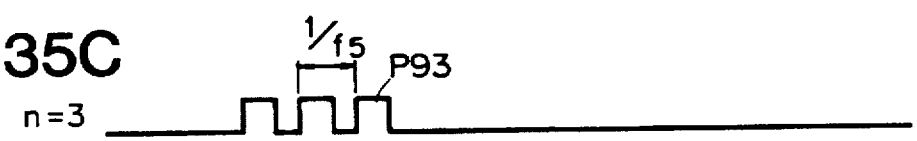
Figure 35D:
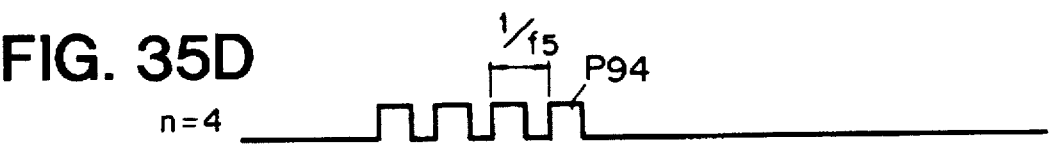
Figure 35E:
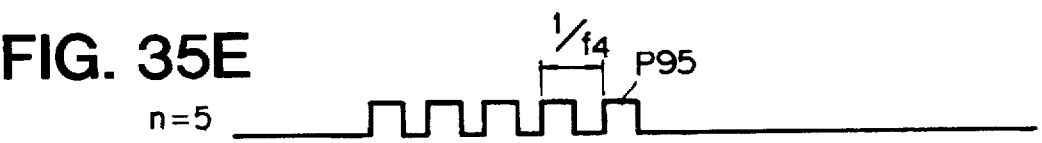
Figure 35F:
Figure 35G:
Figure 35H:

FIG. 34 is a graph which illustrates how properties of a reflection density vary when an image pattern is formed by employing the method of applying ejection signals shown in FIG. 33 to the ink jet head. Since the reflection density varies depending on the number n of liquid droplets when the ejection signal applying method as described above with reference to FIG. 33 is employed, a rate of variation of the reflection density caused as the number of liquid droplets increases as shown in FIG. 34 can be kept substantially constant.

In this embodiment, an ejection frequency f2 is determined such that a quantity of variation of the optical density caused as the number of liquid droplets increases is kept substantially constant. At this time, however, the variation of properties of the optical density as shown in FIG. 34 can be controlled in such a manner as to allow them to vary more preferably by setting the ejection frequency f2 to another value equal to or larger than the refill frequency corresponding to variation of a rate of color-staining occurring on the recording medium.

In addition, in this embodiment, the time interval of applying the ejection signals P71 to P74 to the ink jet head is set to 1/f2. Alternatively, the timing relationship of causing the time interval of applying ejection signals to the ink jet head to be set to 1/f2 may adequately be selected corresponding to the kind of image.

Provided that shock absorbing at the time of liquid droplet ejection for a dot to be next formed is taken into account, it is thinkable that a dot forming frequency of and a time interval of applying each ejection signal to the ink jet head are selected in such a manner that a signal application stopping time equal to or more than 1/fr is reserved after a last ejection signal P77 is applied to the ink jet head forming one dot.

Additionally, it is also thinkable that the time interval of applying each ejection signal to the ink jet head is set to 1/f2, and moreover, the shape of each ejection signal, e.g., representing a pattern width of each ejection signal as well as the magnitude of voltage to be applied to the ink jet head are changed.

Further, it is acceptable that a plurality of ejection frequencies f1, f2, f3, - - - are preliminarily determined so that a time interval of applying each ejection signal to the ink jet head is determined depending on the working environment of an ink jet printing apparatus and similar factors by selecting the foregoing plurality of ejection frequencies including at least one ejection frequency equal to or more than the refill frequency. Since the ink jet system using thermal energy has such properties that a volume of each liquid droplet increases due to elevation of the temperature of the ink jet head itself, resulting in the refill frequency being reduced, it is thinkable that a time interval of applying each ejection signal to the ink jet head is determined by selecting one or more of an ejection frequency larger than the present refill frequency depending on the temperature of an ink jet head to be used and the environmental temperature and then selectively using the thus selected frequency in the same manner as this embodiment.

(A fourth modified example of the third embodiment)

FIGS. 35A–35H show by way of schematic wave shape graphs an ink jet printing method to be practiced in accordance with a further modified embodiment of the third embodiment, showing how ejection signal(s) are applied to the ink jet head. Especially, according to this modified embodiment, an ejection frequency equal to or less than the refill frequency and a plurality of ejection frequencies each larger than the refill frequency are determined before an image is formed at a maximum density by employing a multi-droplet system, and subsequently, two or more kinds of ejection frequencies each larger than the refill frequency are selectively used corresponding to the number of liquid droplets ejected from the ink jet head for forming one dot on the printing medium.

Figure 36:
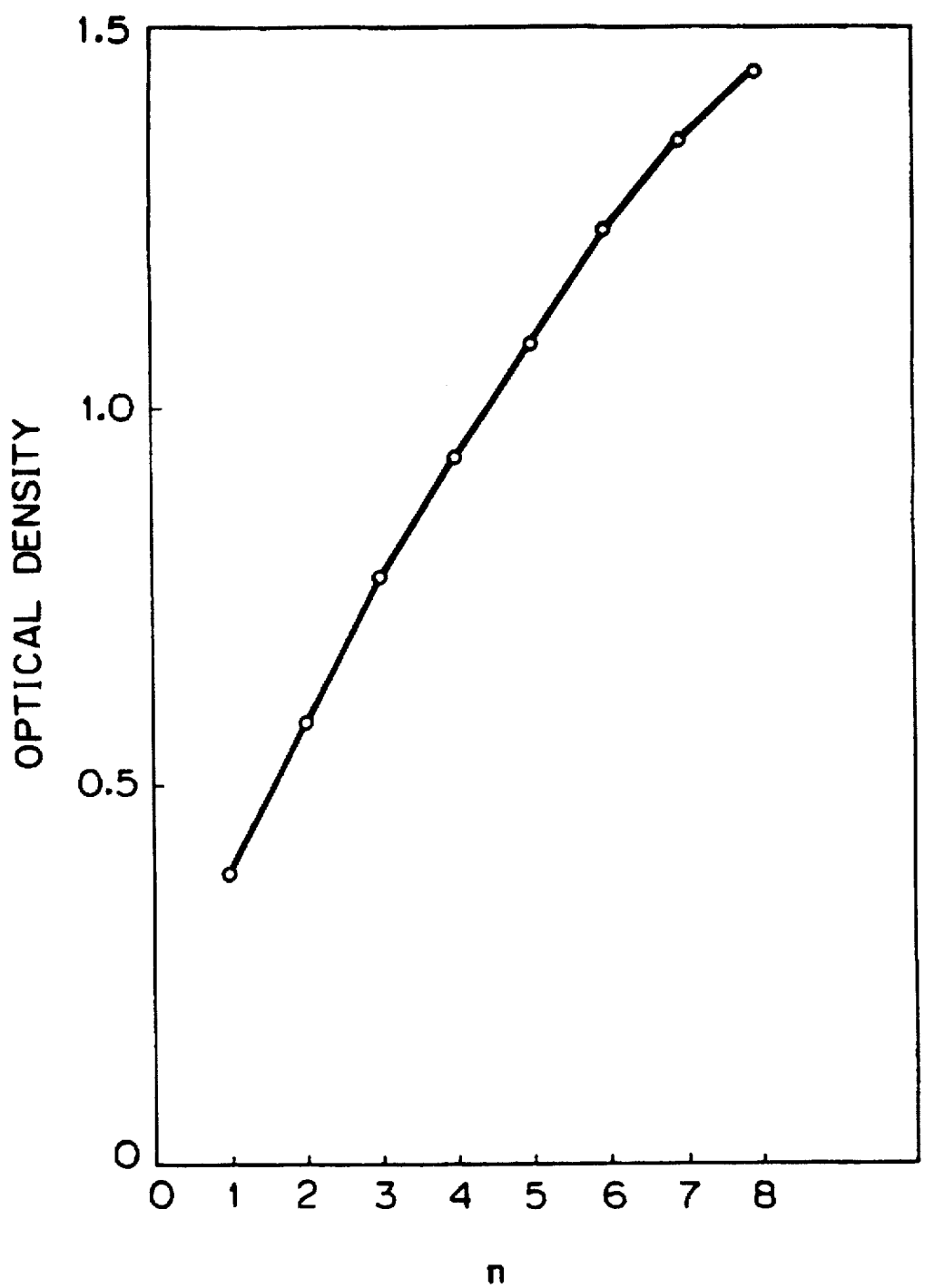
FIG. 36 is a graph which illustratively explains optical density properties of an image formed by using ejection signals shown in FIG. 35.
Figure 37A:
FIGS. 37A–37G are wave shape diagrams which illustratively show a method of applying an ejection signal in accordance with another modified embodiment modified from the third embodiment of the present invention.
Figure 37B:
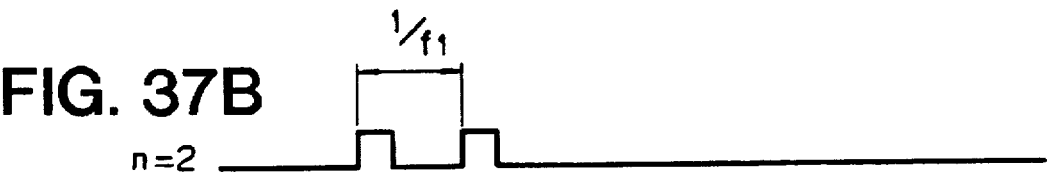
Figure 37C:
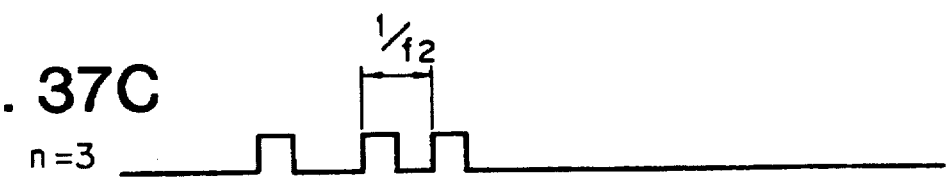
Figure 37D:
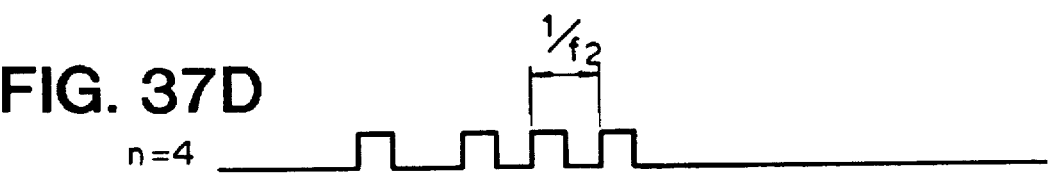
Figure 37E:
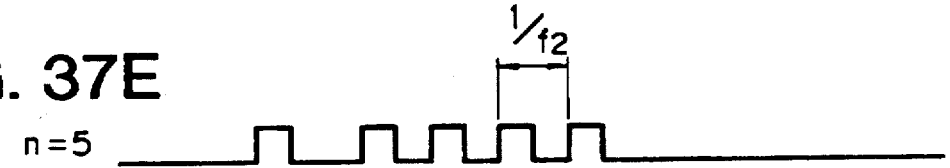
Figure 37F:
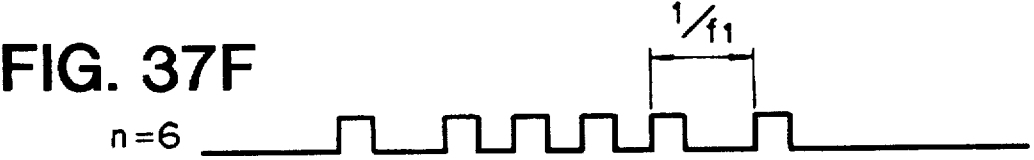
Figure 37G:

In this modified embodiment, an ejection signal is applied to the ink jet head exhibiting properties as shown in FIG. 3 and FIG. 26 by ejecting liquid droplets not only at the refill frequency of fr=3.0 KHz but also at the ejection frequency of f=2.5 KHz wherein three kinds of ejection frequencies of f3=2.5 KHz, f4=5.5 KHz and f5=6.0 KHz are selectively used for the ink jet head. For example, as shown in FIG. 35, in the case that one pixel is formed with a maximum number of eight liquid droplets, each of an ejection signal P91 to an ejection signal P94 is applied to the ink jet head at a time interval of 1/f5, each of an ejection signal P95 and an ejection signal P96 is applied to the ink jet head at a time interval of 1/f4, and each of an ejection signal P97 and an ejection signal P98 is applied to the ink jet head at a time interval of 1/f3 using an ejection frequency of f3 equal to or smaller than the refill frequency fr, whereby a liquid droplet is ejected from the ink jet head corresponding to the relevant ejection signal. At this time, a volume of each liquid droplet corresponding to each of the ejection signals P92, P93 and P94 is smaller than that of each liquid droplet corresponding to each of the ejection signals P95 and P96, and moreover, a volume of each liquid droplet corresponding to each of the ejection signals P95 and P96 is smaller than that of each liquid droplet corresponding to each of the ejection signals P97 and P98. As a result, variation of optical density relative to increasing of the number n of liquid droplets is as shown in FIG. 36. Thus, especially, the optical density can more finely be controlled with small reduction of the value optical density, resulting in a gray level property of each high light image being improved.

In this modified embodiment, an inequality of f3<f4<f5 is established among the ejection frequencies f3, f4 and f5. However, it is acceptable in the light of a technical concept of the present invention that a magnitude of value representing each of the ejection frequencies f3, f4 and f5 is arbitrarily determined corresponding to the kind of a required image, provided that at least one of these ejection frequencies is larger than the refill frequency.

In addition, in this modified embodiment, three kinds of ejection frequencies including two kinds of ejection frequencies each larger than the refill frequency are used. Otherwise, it is thinkable that a predetermined number of plural kinds of ejection frequencies including one or more ejection frequencies each larger than the refill frequency are selectively used.

Additionally, since the properties shown in FIG. 36 and the hitherto known properties shown in FIG. 3 can be obtained using a same ink jet head merely by changing a method of applying each ejection signal to the ink jet head, it is acceptable that a method of applying each ejection signal to the ink jet head as shown in FIG. 35 in accordance with this modified embodiment and a hitherto known method of applying each ejection signal to the conventional ink jet head are used in combination with each other or they are selectively used depending on the kind of an image to be recorded. As a result, e.g., a value of about 1.04 representing the optical density unattainable by employing the method shown in FIG. 35 can be obtained by employing the conventional method. Thus, it is possible to more finely control the gray level employed for the ink jet recording method.

(A fifth modified example of the third embodiment)

FIGS. 37A–37G shows by way of signal shape graphs an ink jet recording method to be practiced in accordance with another modified embodiment of the third embodiment, showing plural kinds of ejection signals to be applied to the ink jet head.

This modified embodiment is concerned with an ink jet recording method which is modified from the embodiment described above with reference to FIG. 33 in order to assure that a higher gray level can be obtained by changing the arrangement of a row of time intervals each effective for applying each ejection signal to the ink jet head when a predetermined number of liquid droplets are ejected from the ink jet head for forming one dot.

Specifically, when the ejection signal applying method shown in FIG. 33 is employed, ejection frequencies of f1=2.5 KHz and f2=5.0 KHz are determined and time intervals for applying each ejection signal to the ink jet head are then arranged in accordance with the order of 1/f2, 1/f2, 1/f2, 1/f1, 1/f1 and 1/f1 to obtain the properties shown in FIG. 33. However, in this modified embodiment, time intervals for applying each ejection signal to the ink jet head are arranged in accordance with the order of 1/f1, 1/f2, 1/f2, 1/f2, 1/f1 and 1/f1 as shown in FIG. 37. When the ejection signal applying method as shown in FIG. 37 is employed, a quantity of variation of the reflection density caused as the number n of liquid droplets can not be kept constant but a value representing the optical density unattainable by the ejection signal applying method shown in FIG. 33 can be obtained. Thus, it is possible to finely control the gray level by usually employing the ejection signal applying method shown in FIG. 33 but selectively employing the ejection signal applying method shown in FIG. 37 corresponding to the kind of an image to be printed.

In this modified embodiment, one example of changing the order of time intervals for applying each ejection signal to the ink jet head is shown and described above with reference to FIG. 37. To assure that a more preferable image can be obtained, the foregoing order of time intervals may arbitrarily be changed as desired. In addition, it is acceptable that time intervals for applying each ejection signal to the recording head are arranged in accordance with another order of 1/f1, 1/f2, 1/f2, 1/f2, 1/f1 and 1/f1, and moreover, the number of usage of a time 1/f2 is changed to another one.

There is obtained a printed medium on which an image is printed with high quality by using an ink jet printing apparatus and an ink jet printing method described above as embodiments of present invention. In printed medium, a paper, a sheet for OHP, a cloth, a color filter, a substrate, or the like may be used. In addition, in the case of forming one dot with a plurality of liquid droplets, these liquid droplets are successively ejected in the above-described embodiments. The present invention is not limitatively adapted to this structure. One dot may be formed with a plurality of liquid droplets each of which is ejected during each scanning of a plurality of scannings of the printing head.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. An ink jet printing apparatus for performing printing with an ink jet head adapted to eject liquid droplets therefrom by ejecting a plurality of liquid droplets from said ink jet head to a substantially same location on a printing medium to form a dot, which corresponds to one pixel, comprising:

judging means for judging whether or not a number of liquid droplets for forming dots located adjacent to each other on said printing medium is equal to or more than a predetermined number, said dots located adjacent to each other being formed with different kinds of inks; and suppressing means for suppressing a quantity of liquid droplets for forming at least one of said dots located adjacent to each other when said judging means determines that the number of liquid droplets required for forming said dots located adjacent to each other is equal to or more than the predetermined number.

2. An ink jet printing apparatus as claimed in claim 1, wherein said judging means judges whether or not said number of liquid droplets is equal to or more than said predetermined number when said dots located adjacent to each other are formed with liquid droplets each having a different color tone.

3. An ink jet printing apparatus as claimed in claim 2, wherein said suppressing means suppresses a number of liquid droplets required for forming at least one of said dots located adjacent to each other.

4. An ink jet printing apparatus as claimed in claim 3, wherein said suppressing means selects any one from two kinds or more of preset maximum numbers of liquid droplets, said preset maximum numbers of liquid droplets being smaller than the number of liquid droplets required for forming each one of said dots located adjacent to each other.

5. An ink jet printing apparatus as claimed in claim 4, wherein said ink jet head forms gas bubbles in liquid by utilizing thermal energy and then ejects liquid droplets therefrom as said gas bubbles grow.

6. An ink jet printing apparatus as claimed in claim 2, wherein said suppressing means suppresses an average quantity of liquid droplets that is a quotient obtained by dividing a total quantity of liquid droplets required for forming said dots by the number of liquid droplets to be ejected.

7. An ink jet printing apparatus as claimed in claim 6, wherein said suppressing means selects any one from two or more kinds of preset average quantities of liquid droplets, said preset average quantities of liquid droplets being smaller than the average quantity of liquid droplets required for forming said dots located adjacent to each other.

8. An ink jet printing apparatus as claimed in claim 7, wherein said ink jet head forms gas bubbles in liquid by utilizing thermal energy and then ejects liquid droplets therefrom as said gas bubbles grow.

9. An ink jet printing apparatus as claimed in claim 2, wherein said suppressing means suppresses a quantity of liquid droplets required for forming each of said dots located adjacent to each other.

10. An ink jet printing apparatus as claimed in claim 9, wherein said suppressing means suppresses a quantity of each of liquid droplets by changing a frequency of ejection of said liquid droplets.

11. An ink jet printing apparatus as claimed in claim 10, wherein said suppressing means selects any one from two kinds or more of preset frequencies of ejection of said liquid droplets.

12. An ink jet printing apparatus as claimed in claim 11, wherein said two kinds or more of preset frequencies of ejection of said liquid droplets include at least one ejection frequency which is larger than a refill frequency for refilling nozzles of said ink jet head with liquid after ejecting a liquid droplet.

13. An ink jet printing apparatus as claimed in claim 12, wherein said ink jet head forms gas bubbles in liquid by utilizing thermal energy and then ejects liquid droplets therefrom as said gas bubbles grow.

14. An ink jet printing method of performing printing by ejecting a plurality of liquid droplets to a substantially same location on a printing medium to form a dot, which corresponds to one pixel, said method comprising the steps of:

providing an ink jet head for ejecting said liquid droplets therefrom;

detecting a number of liquid droplets forming each dot;

judging based on a result of said detecting step, whether the number of liquid droplets forming dots located adjacent to each other is equal to or more than a predetermined number, said dots located adjacent to each other being formed with different kinds of inks; and suppressing a quantity of liquid droplets for forming at least one of said dots located adjacent to each other when the number of liquid droplets required for forming said dots located adjacent to each other is equal to or more than the predetermined number.

15. An ink jet printing method of performing printing by ejecting a plurality of liquid droplets to a substantially same location on a printing medium to form a dot, said method comprising the steps of:

suppressing a quantity of liquid droplets required for forming dots along a boundary between adjacent zones, each zone having a different color tone; and forming the printing by ejecting the liquid droplets to form the dots.

16. An ink jet printing method of performing printing by ejecting a plurality of liquid droplets to a printing medium to form a dot, said method comprising the steps of:

providing an ink jet head for ejecting said liquid droplets therefrom; and controlling liquid ejection at a frequency of ejecting said liquid droplets to be larger than a refill frequency of said ink jet head when said dot is formed with a plurality of ink droplets, the refill frequency being a frequency for refilling nozzles of said ink jet head with liquid after electing a liquid droplet.

17. A printed medium which receives a liquid droplet and was printed by using the ink jet printing method claimed in any one of claims 14–16.

18. An ink jet printing apparatus as claimed in claim 1, wherein said dots located adjacent to each other comprise two dots.

19. An ink jet printing method as claimed in claim 14, wherein said dots located adjacent to each other comprise two dots.

20. An ink jet printing method as claimed in claim 15, wherein each dot corresponds to one pixel.

21. An ink jet printing method as claimed in claim 16, wherein each dot corresponds to one pixel.

* * * * *

UNITED STATES PATENT AND TRADEMARK OFFICE
CERTIFICATE OF CORRECTION

PATENT NO. : 5,717,448
DATED : February 10, 1998
INVENTOR(S) : Genji INADA, et al.

It is certified that error appears in the above-identified patent and that said Letters Patent is hereby corrected as shown below:

ON THE COVER PAGE

AT [57] ABSTRACT:

Line 10, "that" should be deleted.

COLUMN 2:

Line 44, "droplet" should read --droplets--;

Line 58, "paper" (second occurrence) should read --Paper--.

COLUMN 4:

Line 27, "8-8G," should read --8A-8G,--;

Line 31, "add" should read --and--;

Line 57, "colored-droplets" should read --colored droplets--.

UNITED STATES PATENT AND TRADEMARK OFFICE
CERTIFICATE OF CORRECTION

PATENT NO. : 5,717,448

DATED : February 10, 1998

INVENTOR(S) : Genji INADA, et al.

It is certified that error appears in the above-identified patent and that said Letters Patent is hereby corrected as shown below:

COLUMN 5:

Line 35, "clearly" should read --be clearly--;

Line 39, "set" should read --sets--.

COLUMN 6:

Line 66, "same" should read --the same--.

COLUMN 7:

Line 49, "at" should read --in the--.

COLUMN 8:

Line 14, "liquid-droplets" should read --liquid droplets--.

COLUMN 9:

Line 17, "11A-11B" should read --11A-11G--.

UNITED STATES PATENT AND TRADEMARK OFFICE
CERTIFICATE OF CORRECTION

PATENT NO. : 5,717,448

DATED : February 10, 1998

INVENTOR(S) : Genji INADA, et al.

It is certified that error appears in the above-identified patent and that said Letters Patent is hereby corrected as shown below:

COLUMN 11:

Line 9, "or the" should read --of the--;

Line 13, "shows" should be deleted.

COLUMN 12:

Line 14, "which" should read --whose--;

Line 36, "casiness" should read --easiness--;

Line 67, "shown" should read --shown in--.

COLUMN 14:

Line 3, "corresponding" should read --corresponding to--;

Line 4, "corresponding" should read --corresponding to--.

COLUMN 15:

Line 26, "are" should read --is--.

UNITED STATES PATENT AND TRADEMARK OFFICE
CERTIFICATE OF CORRECTION

PATENT NO. : 5,717,448

DATED : February 10, 1998

INVENTOR(S) : Genji INADA, et al.

It is certified that error appears in the above-identified patent and that said Letters Patent is hereby corrected as shown below:

COLUMN 16:

Line 11, "lapping" should read --overlappings--.

COLUMN 17:

Line 38, "comes" should read --come--.

COLUMN 18:

Line 55, "averages" should read --average--.

COLUMN 20:

Line 50, "an" should be deleted.

COLUMN 21:

Line 33, "see" should read --set--.

COLUMN 22:

Line 32, "F92," should read --P92,--.

UNITED STATES PATENT AND TRADEMARK OFFICE
CERTIFICATE OF CORRECTION

PATENT NO. : 5,717,448
DATED : February 10, 1998
INVENTOR(S) : Genji INADA, et al.

It is certified that error appears in the above-identified patent and that said Letters Patent is hereby corrected as shown below:

<u>COLUMN 26</u>:

Line 20, "shows" should read --show--;

Line 66, "In" should read --For--.

Signed and Sealed this

Eighteenth Day of August, 1998

*Attest:*

BRUCE LEHMAN

*Attesting Officer*     *Commissioner of Patents and Trademarks*